(12) United States Patent
Lindbo et al.

(10) Patent No.: US 11,851,276 B2
(45) Date of Patent: Dec. 26, 2023

(54) SYSTEMS AND METHODS FOR ORDER PROCESSING

(71) Applicant: Ocado Innovation Limited, Hatfield (GB)

(72) Inventors: Lars Sverker Ture Lindbo, Hatfield (GB); Andrew John Ingram-Tedd, Hatfield (GB); Stuart Richard North, Hatfield (GB); Robert Rolf Stadie, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 0 days.

(21) Appl. No.: 18/144,133

(22) Filed: May 5, 2023

(65) Prior Publication Data

US 2023/0271778 A1    Aug. 31, 2023

Related U.S. Application Data

(63) Continuation of application No. 17/951,865, filed on Sep. 23, 2022, now abandoned, which is a
(Continued)

(30) Foreign Application Priority Data

Jun. 17, 2013  (GB) ..................................... 1310784

(51) Int. Cl.
*B65G 1/04*    (2006.01)
*B65G 1/06*    (2006.01)
(Continued)

(52) U.S. Cl.
CPC .......... *B65G 1/0464* (2013.01); *B25J 9/0093* (2013.01); *B25J 9/0096* (2013.01); *B65D 21/02* (2013.01);
(Continued)

(58) Field of Classification Search
CPC .... B65G 1/0464; B65G 1/065; B65G 1/1378; B25J 9/0093; B25J 9/0096; B65D 21/02;
(Continued)

(56) References Cited

U.S. PATENT DOCUMENTS 3,923,187 A   12/1975 Johansson et al.
4,088,232 A    5/1978 Lilly
(Continued)

FOREIGN PATENT DOCUMENTS

CA         2735988       3/2010
CN       101407271       4/2009
(Continued)

OTHER PUBLICATIONS

International Search Report (PCT/ISA/210) dated Nov. 5, 2014, by the IB Patent Office as the International Searching Authority for International Application No. PCT/IB2014/062165.
(Continued)

*Primary Examiner* — Thomas Randazzo
(74) *Attorney, Agent, or Firm* — Knobbe, Martens, Olson & Bear, LLP

(57) ABSTRACT

Systems, methods, and machine-executable coded instruction sets are disclosed for fully- and/or partly automated handling of goods. The disclosure provides improvements in the storage and retrieval of storage and delivery containers in order processing systems.

30 Claims, 21 Drawing Sheets

Related U.S. Application Data continuation of application No. 16/786,333, filed on Feb. 10, 2020, now Pat. No. 11,453,552, which is a continuation of application No. 15/790,704, filed on Oct. 23, 2017, now Pat. No. 10,556,742, which is a continuation of application No. 14/899,367, filed as application No. PCT/IB2014/062165 on Jun. 12, 2014, now Pat. No. 9,796,080.

(51) Int. Cl.
| | | |
|---|---|---|
| *B65G 1/137* | (2006.01) | |
| *G06Q 10/08* | (2023.01) | |
| *B25J 9/00* | (2006.01) | |
| *B65D 21/02* | (2006.01) | |
| *G05B 19/418* | (2006.01) | |
| *G06Q 10/087* | (2023.01) | |
| *G06Q 10/083* | (2023.01) | |

(52) U.S. Cl.
CPC ..... *B65D 21/0209* (2013.01); *B65D 21/0233* (2013.01); *B65G 1/065* (2013.01); *B65G 1/1378* (2013.01); *G05B 19/4189* (2013.01); *G06Q 10/083* (2013.01); *G06Q 10/087* (2013.01); *Y10S 901/01* (2013.01); *Y10S 901/02* (2013.01)

(58) Field of Classification Search
CPC ............ B65D 21/0209; B65D 21/0233; G05B 19/4189; G06Q 10/083; G06Q 10/087; Y10S 901/01; Y10S 901/02
See application file for complete search history.

(56) References Cited

U.S. PATENT DOCUMENTS

| | | | |
|---|---|---|---|
| 4,602,715 | A | 7/1986 | Sarver et al. |
| 4,674,948 | A | 6/1987 | Hornacek |
| 5,380,139 | A | 1/1995 | Pohjonen et al. |
| 5,598,943 | A | 2/1997 | Markus |
| 6,654,662 | B1 | 11/2003 | Hognaland |
| 6,895,301 | B2 | 5/2005 | Mountz |
| 7,097,045 | B2 | 8/2006 | Winkler |
| 7,912,574 | B2 | 3/2011 | Wurman et al. |
| 8,092,140 | B2 | 1/2012 | Baker et al. |
| 8,311,902 | B2 | 11/2012 | Mountz et al. |
| 8,628,289 | B1 | 1/2014 | Benedict et al. |
| 8,758,178 | B2 | 6/2014 | Gunji et al. |
| 9,002,506 | B1 | 4/2015 | Agarwal et al. |
| 9,139,363 | B2 | 9/2015 | Lert |
| 9,187,244 | B2 | 11/2015 | Toebes et al. |
| 9,188,982 | B2 | 11/2015 | Thomson |
| 9,334,081 | B2 | 5/2016 | Derby et al. |
| 9,422,108 | B2 | 8/2016 | Hognaland |
| 9,481,530 | B2 | 11/2016 | Brandmüller et al. |
| 9,792,577 | B2 | 10/2017 | Mountz et al. |
| 9,796,080 | B2 * | 10/2017 | Lindbo .............. B65D 21/0209 |
| 9,886,036 | B2 | 2/2018 | Douglas et al. |
| 10,189,641 | B2 | 1/2019 | Hognaland |
| 10,556,742 | B2 * | 2/2020 | Lindbo .................. B25J 9/0096 |
| 11,453,552 | B2 * | 9/2022 | Lindbo .............. B65D 21/0209 |
| 2003/0155731 | A1 | 8/2003 | Ditges et al. |
| 2003/0230510 | A1 | 12/2003 | Aiken et al. |
| 2004/0146380 | A1 | 7/2004 | Baker et al. |
| 2006/0095160 | A1 | 5/2006 | Orita et al. |
| 2007/0295632 | A1 | 12/2007 | Palisin |
| 2008/0025833 | A1 | 1/2008 | Baker et al. |
| 2008/0105583 | A1 | 5/2008 | Stahl |
| 2009/0185884 | A1 | 7/2009 | Wurman et al. |
| 2009/0299521 | A1 | 12/2009 | Hansl et al. |
| 2010/0316468 | A1 | 12/2010 | Lert et al. |
| 2011/0106295 | A1 | 5/2011 | Miranda et al. |
| 2011/0130869 | A1 | 6/2011 | Linge et al. |
| 2011/0295413 | A1 | 12/2011 | Hara et al. |
| 2012/0101627 | A1 | 4/2012 | Lert |
| 2012/0195720 | A1 | 8/2012 | Sullivan et al. |
| 2013/0015675 | A1 | 1/2013 | Pickard et al. |
| 2013/0073076 | A1 | 3/2013 | Mathi et al. |
| 2013/0213755 | A1 | 8/2013 | Shibata et al. |
| 2014/0288696 | A1 * | 9/2014 | Lert ..................... B65G 1/1373 700/216 |
| 2015/0127143 | A1 | 5/2015 | Lindbo et al. |
| 2016/0075464 | A1 | 3/2016 | Turner |
| 2018/0043528 | A1 | 2/2018 | Lindbo et al. |

FOREIGN PATENT DOCUMENTS

| | | |
|---|---|---|
| CN | 101553416 | 10/2009 |
| DE | 2629718 | 1/1978 |
| EP | 2336075 | 6/2011 |
| EP | 2518000 | 1/2014 |
| JP | S4823169 | 3/1973 |
| JP | H08157016 | 6/1996 |
| JP | H10181869 | 7/1998 |
| JP | H10236605 | 9/1998 |
| JP | H10299280 | 11/1998 |
| JP | 2008037567 | 2/2008 |
| JP | 2011126667 | 6/2011 |
| JP | 4883616 B | 2/2012 |
| WO | WO 98/049075 | 11/1998 |
| WO | WO 2012/026824 | 3/2012 |
| WO | WO 2012/103566 | 8/2012 |
| WO | WO 2013/167907 | 11/2013 |

OTHER PUBLICATIONS

Third Party Observation for PCT Application PCT/IB2014/062165, filed Aug. 19, 2015, in 30 pages.

Written Opinion (PCT/ISA/237) dated Nov. 5, 2014, by the IB Patent Office as the International Searching Authority for International Application No. PCT/IB2014/062165.

Complaint for Patent Infringement with Exhibits, *Ocado Innovation Ltd. and Ocado Solutions Ltd. VS. Autostore AS and Autostore System Inc.*, Case No. 1:21-cv-00041-JL, filed Jan. 17, 2021, in 570 pages (two uploads).

First Amended Complaint for Patent Infringement with Exhibits, *Ocado Innovation Ltd. and Ocado Solutions Ltd. vs. Autostore AS and Autostore System Inc.*, Case No. 1:21-cv-00041-JL, filed Feb. 16, 2021, in 585 pages (two uploads).

Defendant's Motion to Dismiss with Memorandum of Law in Support of Motion and Exhibits, Ocado Innovation Ltd. and Ocado Solutions Ltd. vs. Autostore AS and Autostore Systems, Inc., Case No. 1:21- cv-00041-JL, filed Mar. 22, 2021, in 121 pages.

Second Amended Complaint for Patent Infringement with Exhibits, *Ocado Innovation Ltd. and OcadoSolutions Ltd. vs. Autostore AS and Autostore System Inc.*, Case No. 1:21-cv-00041-JL, filed Apr. 23, 2021, in 790 pages (two uploads).

Declaration of Dr. Stephen Derby in Support of Petition for Inter Partes Review of U.S. Pat. No. 9,796,080, Ex. 1003, *Autostore System Inc. v. Ocado Innovation Limited*, Inter Partes Review No. IPR2021-00798, dated Apr. 12, 2021, in 97 pages.

Petition for Inter Partes Review of U.S. Pat. No. 9,796,080, *Autostore System Inc. v. Ocado Innovation Limited*, Inter Partes Review No. IPR2021-00798, dated Apr. 12, 2021, in 89 pages.

Ergonomics, Safety and Health Topics, United States Department of Labor, Occupational Safety and Health Administration, Ex. 1010 from Petition for Inter Partes Review of U.S. Pat. No. 9,796,080, *Autostore System Inc. v. Ocado Innovation Limited*, Inter Partes Review No. IPR2021-00798, dated Apr. 12, 2021, in 4 pages.

Defendant's Partially Renewed Motion to Dismiss with Memorandum of Law in Support of Partially Renewed Motion and Exhibits, *Ocado Innovation Ltd. and Ocado Solutions Ltd. vs. Autostore AS and Autostore Systems, Inc.*, Case No. 1:21-cv-00041-JL, filed May 7, 2021, in 111 pages.

Plaintiffs' Opposition to Defendant's Partially Renewed Motion to Dismiss, *Ocado Innovation Ltd. and Ocado Solutions Ltd. vs. Autostore AS and Autostore Systems, Inc.*, Case No. 1:21-cv-00041-JL, filed May 21, 2021, in 37 pages.

(56) References Cited

OTHER PUBLICATIONS

Defendant's Reply in Support of Partially Renewed Motion to Dismiss, *Ocado Innovation Ltd. and Ocado Solutions Ltd.* vs. *Autostore AS and Autostore Systems, Inc.*, Case No. 1:21-cv-00041-JL, filed May 28, 2021, in 18 pages.
Defendant's Notice of Supplemental Authority in Support of Partially Renewed Motion to Dismiss, *Ocado Innovation Ltd. and Ocado Solutions Ltd.* vs. *Autostore AS and Autostore Systems, Inc.*, Case No. 1:21-cv-00041-JL, filed Jun. 22, 2021, in 21 pages.
Plaintiff's Notice of Supplemental Authority in Opposition to Partially Renewed Motion to Dismiss, *Ocado Innovation Ltd. and Ocado Solutions Ltd.* vs. *Autostore AS and Autostore Systems, Inc.*, Case No. 1:21-cv-00041-JL, filed Jun. 23, 2021, in 38 pages.
Defendant's Notice of Supplemental Authority in Support of Partially Renewed Motion to Dismiss, *Ocado Innovation Ltd. and Ocado Solutions Ltd.* vs. *Autostore AS and Autostore Systems, Inc.*, Case No. 1:21-cv-00041-JL, filed Jul. 29, 2021, in 15 pages.
Memorandum Order Denying Defendant's Partially Renewed Motion to Dismiss, *Ocado Innovation Ltd. and Ocado Solutions Ltd.* vs. *Autostore AS and Autostore Systems, Inc.*, Case No. 1:21-cv-00041-JL, filed Aug. 13, 2021, in 38 pages.
"An Introduction To The AutoStore System," AutoStore Concept Ver. 01.10a Commercial, dated 2004, in 36 pages.
Defendant's Answer, Affirmative Defenses, and Counterclaims to Plaintiff's Second Amended Complaint, *Ocado Innovation Ltd. and Ocado Solutions Ltd.* vs. *Autostore AS and Autostore Systems, Inc.*, Case No. 1:21-cv-00041-JL, filed Aug. 27, 2021, in 49 pages.
Plaintiff's Answer to Defendant's Counterclaims, *Ocado Innovation Ltd. and Ocado Solutions Ltd.* VS. *Autostore AS and Autostore Systems, Inc.*, Case No. 1:21-cv-00041-JL, filed Oct. 1, 2021, in 9 pages.
Plaintiff's Motion to Strike Defendant's Affirmative Defense of Inequitable Conduct and Memorandum in Support of Motion, *Ocado Innovation Ltd. and Ocado Solutions Ltd.* vs. *Autostore AS and Autostore Systems, Inc.*, Case No. 1:21-cv-00041-JL, filed Oct. 1, 2021, in 48 pages.
Complaint for Patent Infringement with Exhibits, *Ocado Innovation Ltd. and Ocado Solutions Ltd.* VS. *Autostore AS and Autostore System Inc.*, Case No. 1:21-cv-00806-JL, filed Oct. 6, 2021, in 438 pages.
Plaintiff's Reply Memorandum in Further Support of Motion to Strike Defendant's Affirmative Defense of Inequitable Conduct, *Ocado Innovation Ltd. and Ocado Solutions Ltd.* vs. *Autostore AS and Autostore Systems, Inc.*, Case No. 1:21-cv-00041-JL, filed Oct. 22, 2021, in 14 pages.
Corrected Order of Consolidation Consolidating Case No. 1:21-cv-00041-JL and 1:21-cv-00806-JL, *Ocado Innovation Ltd. and Ocado Solutions Ltd.* vs. *Autostore AS and Autostore Systems, Inc.*, filed Dec. 8, 2021, in 2 pages.
Defendant's Answer, Affirmative Defenses, and Counterclaims to Plaintiff's Complaint in Former Case No. 1:21-cv-00806-JL, *Ocado Innovation Ltd. and Ocado Solutions Ltd.* vs. *Autostore AS and Autostore Systems, Inc.*, Case No. 1:21-cv-00041-JL, filed Dec. 10, 2021, in 36 pages.
"AutoStore Logistics-Technical Presentation", retrieved from www.youtube.com/walch?v=iyVDMp2bL9c, in 1 page.
Memorandum Order Granting Plaintiff's Motion to Strike Defendant's Inequitable Conduct Defense, *Ocado Innovation Ltd. and Ocado Solutions Ltd.* vs. *Autostore AS and Autostore Systems, Inc.*, Case No. 1:21-cv-00041-JL, filed Dec. 30, 2021, in 13 pages.
Plaintiff's Answer to Defendant's Counterclaims in Former Case No. 1:21-cv-00806-JL, *Ocado Innovation Ltd. and Ocado Solutions Ltd.* vs. *Autostore AS and Autostore Systems, Inc.*, Case No. 1:21-cv-00041-JL, filed Dec. 31, 2021, in 6 pages.
Patent Owner Preliminary Response for Inter Partes Review of U.S. Pat. No. 9,796,080, *Autostore System Inc. v. Ocado Innovation Limited*, Inter Partes Review No. IPR2021-00798, dated Jul. 23, 2021, in 55 pages.
Declaration of Dr. Brian Pfeifer in Support of Patent Owner Preliminary Response for Inter Partes Review of U.S. Pat. No. 9,796,080, Ex. 2009, *Autostore System Inc. v. Ocado Innovation Limited*, Inter Partes Review No. IPR2021-00798, dated Jul. 22, 2021, in 51 pages.
Definition of "grid", Random House Webster's College Dictionary, dated 2000, in 3 pages.
Definition of "autonomous", Merriam-Webster's Unabridged Dictionary, dated 2021, in 2 pages.
Petitioner Reply to Patent Owner Preliminary Response for Inter Partes Review of U.S. Pat. No. 9,796,080, *Autostore System Inc. v. Ocado Innovation Limited*, Inter Partes Review No. IPR2021-00798, dated Aug. 17, 2021, in 23 pages.
Conference Call Transcript for Inter Partes Review of U.S. Pat. No. 9,796,080, *Autostore System Inc. v. Ocado Innovation Limited*, Inter Partes Review No. IPR2021-00798, dated Aug. 10, 2021, in 16 pages.
Patent Owner Sur-Reply to Petitioner Reply to Preliminary Response for Inter Partes Review of U.S. Pat. No. 9,796,080, *Autostore System Inc. v. Ocado Innovation Limited*, Inter Partes Review No. IPR2021-00798, dated Aug. 24, 2021, in 21 pages.
Decision Denying Institution for Inter Partes Review of U.S. Pat. No. 9,796,080, *Autostore System Inc. v. Ocado Innovation Limited*, Inter Partes Review No. IPR2021-00798, dated Oct. 8, 2021, in 23 pages.
Petitioner Request for Rehearing for Inter Partes Review of U.S. Pat. No. 9,796,080, *Autostore System Inc. v. Ocado Innovation Limited*, Inter Partes Review No. IPR2021-00798, dated Nov. 8, 2021, in 21 pages.
Defendant's Opposition to Plaintiff's Motion to Strike, *Ocado Innovation Ltd. and Ocado Solutions Ltd.* vs. *Autostore AS and Autostore Systems, Inc.*, Case No. 1:21-cv-00041-JL, filed Jun. 7, 2022, in 19 pages.
Plaintiff's Reply Memorandum in Further Support of Motion to Strike Defendant's Untimely Proposed Claim Constructions, *Ocado Innovation Ltd. and Ocado Solutions Ltd.* vs. *Autostore AS and Autostore Systems, Inc.*, Case No. 1:21-cv-00041-JL, filed Jun. 13, 2022, in 6 pages.
Defendant's Sur-Reply in Opposition to Plaintiff's Motion to Strike, *Ocado Innovation Ltd. and Ocado Solutions Ltd.* vs. *Autostore AS and Autostore Systems, Inc.*, Case No. 1:21-cv-00041-JL, filed Jun. 14, 2022, in 9 pages.
Defendant's Motion to Partially Strike Plaintiff's First Supplemental Preliminary Infringement Contentions, *Ocado Innovation Ltd. and Ocado Solutions Ltd.* vs. *Autostore AS and Autostore Systems, Inc.*, Case No. 1:21-cv-00041-JL, filed Jun. 1, 2022, in 5 pages.
Plaintiff's Opposition to Defendant's Motion to Partially Strike Plaintiff's First Supplemental Preliminary Infringement Contentions, *Ocado Innovation Ltd. and Ocado Solutions Ltd.* vs. *Autostore AS and Autostore Systems, Inc.*, Case No. 1:21-cv-00041-JL, filed Jun. 7, 2022, in 12 pages.
Defendant's Reply in Support of Motion to Partially Strike Plaintiff's First Supplemental Preliminary Infringement Contentions, *Ocado Innovation Ltd. and Ocado Solutions Ltd.* vs. *Autostore AS and Autostore Systems, Inc.*, Case No. 1:21-cv-00041-JL, filed Jun. 10, 2022, in 9 pages.
Joint Claim Construction and Prehearing Statement, *Ocado Innovation Ltd. and Ocado Solutions Ltd.* vs. *Autostore AS and Autostore Systems, Inc.*, Case No. 1:21-cv-00041-JL, filed Jun. 3, 2022, in 80 pages.
Defendant's SPR 6.1(a) Disclosure of Claim Terms Proposed for Construction, *Ocado Innovation Ltd. and Ocado Solutions Ltd.* vs. *Autostore AS and Autostore Systems, Inc.*, Case No. 1:21-cv-00041-JL, dated Mar. 24, 2022, in 8 pages.
Plaintiff's Proposed Claim Constructions and Supporting Evidence, *Ocado Innovation Ltd. and Ocado Solutions Ltd.* vs. *Autostore AS and Autostore Systems, Inc.*, Case No. 1:21-cv-00041-JL, dated Apr. 21, 2022, in 28 pages.
Plaintiff's Supplemental Proposed Claim Constructions and Supporting Evidence, *Ocado Innovation Ltd. and Ocado Solutions Ltd.* vs. *Autostore AS and Autostore Systems, Inc.*, Case No. 1:21-cv-00041-JL, dated May 13, 2022, in 29 pages.
Declaration of Dr. Brian Pfeifer in Support of Plaintiff's Proposed Claim Constructions, *Ocado Innovation Ltd. and Ocado Solutions*

(56) References Cited

OTHER PUBLICATIONS

Ltd. vs. *Autostore AS and Autostore Systems, Inc.*, Case No. 1:21-cv-00041- JL, dated May 27, 2022, in 35 pages.
Declaration of Dr. Petros Ioannou in Support of Defendant's Proposed Claim Constructions, *Ocado Innovation Ltd. and Ocado Solutions Ltd. vs. Autostore AS and Autostore Systems, Inc.*, Case No. 1:21- cv-00041-JL, dated May 27, 2022, in 78 pages.
Declaration of Dr. Raffaello D'Andrea in Support of Plaintiff's Proposed Claim Constructions, *Ocado Innovation Ltd. and Ocado Solutions Ltd. vs. Autostore AS and Autostore Systems, Inc.*, Case No. 1:21- cv-00041-JL, dated May 27, 2022, in 64 pages.
Declaration of Dr. Matthew Spenko in Support of Defendant's Proposed Claim Constructions, *Ocado Innovation Ltd. and Ocado Solutions Ltd. vs. Autostore AS and Autostore Systems, Inc.*, Case No. 1:21- cv-00041-JL, dated May 27, 2022, in 22 pages.
Plaintiff's Updated Supplemental Proposed Claim Constructions and Supporting Evidence, *Ocado Innovation Ltd. and Ocado Solutions Ltd. vs. Autostore AS and Autostore Systems, Inc.*, Case No. 1:21- cv-00041-JL, dated May 27, 2022, in 36 pages.
Rebuttal Declaration of Dr. Stephen Derby Regarding Claim Construction, *Ocado Innovation Ltd. and Ocado Solutions Ltd. vs. Autostore AS and Autostore Systems, Inc.*, Case No. 1:21-cv-00041-JL, dated Jun. 24, 2022, in 38 pages.
Rebuttal Declaration of Dr. Petros Ioannou Regarding Claim Construction, *Ocado Innovation Ltd. and Ocado Solutions Ltd. vs. Autostore AS and Autostore Systems, Inc.*, Case No. 1:21-cv-00041-JL, dated Jun. 24, 2022, in 135 pages.
Rebuttal Declaration of Dr. Brian Pfeifer Regarding Claim Construction, *Ocado Innovation Ltd. and Ocado Solutions Ltd. vs. Autostore AS and Autostore Systems, Inc.*, Case No. 1:21-cv-00041-JL, dated Jun. 24, 2022, in 15 pages.
Rebuttal Declaration of Dr. Raffaello D'Andrea Regarding Claim Construction, *Ocado Innovation Ltd. and Ocado Solutions Ltd. vs. Autostore AS and Autostore Systems, Inc.*, Case No. 1:21-cv-00041-JL, dated Jun. 24, 2022, in 41 pages.
Rebuttal Declaration of Dr. Matthew Spenko Regarding Claim Construction, *Ocado Innovation Ltd. and Ocado Solutions Ltd. vs. Autostore AS and Autostore Systems, Inc.*, Case No. 1:21-cv-00041-JL, dated Jun. 24, 2022, in 6 pages.
First Supplemental Exhibit A-1 Alleged Invalidity Chart for U.S. Pat. No. 9,796,080, *Ocado Innovation Ltd. and Ocado Solutions Ltd. vs. Autostore AS and Autostore System Inc.*, Case No. 1:21-cv-00041- JL, dated May 16, 2022, in 191 pages.
First Supplemental Exhibit A-2 Alleged Invalidity Chart for U.S. Pat. No. 9,796,080, *Ocado Innovation Ltd. and Ocado Solutions Ltd. vs. Autostore AS and Autostore System Inc.*, Case No. 1:21-cv-00041- JL, dated May 16, 2022, in 159 pages.
First Supplemental Exhibit A-3 Alleged Invalidity Chart for U.S. Pat. No. 9,796,080, *Ocado Innovation Ltd. and Ocado Solutions Ltd. vs. Autostore AS and Autostore System Inc.*, Case No. 1:21-cv-00041- JL, dated May 16, 2022, in 151 pages.
First Supplemental Exhibit A-4 Alleged Invalidity Chart for U.S. Pat. No. 9,796,080, *Ocado Innovation Ltd. and Ocado Solutions Ltd. vs. Autostore AS and Autostore System Inc.*, Case No. 1:21-cv-00041- JL, dated May 16, 2022, in 142 pages.
First Supplemental Exhibit A-5 Alleged Invalidity Chart for U.S. Pat. No. 9,796,080, *Ocado Innovation Ltd. and Ocado Solutions Ltd. vs. Autostore AS and Autostore System Inc.*, Case No. 1:21-cv-00041- JL, dated May 16, 2022, in 85 pages.
First Supplemental Exhibit A-6 Alleged Invalidity Chart for U.S. Pat. No. 9,796,080, *Ocado Innovation Ltd. and Ocado Solutions Ltd. vs. Autostore AS and Autostore System Inc.*, Case No. 1:21-cv-00041- JL, dated May 16, 2022, in 106 pages.
Plaintiff's Opening Claim Construction Brief, *Ocado Innovation Ltd. and Ocado Solutions Ltd. VS. Autostore AS and Autostore Systems, Inc.*, Case No. 1:21-cv-00041-JL, dated Aug. 1, 2022, in 69 pages.
Defendant's Opening Claim Construction Brief, *Ocado Innovation Ltd. and Ocado Solutions Ltd. VS. Autostore AS and Autostore Systems, Inc.*, Case No. 1:21-cv-00041-JL, dated Aug. 1, 2022, in 65 pages.
Gawrilow et al., "Dynamic Routing of Automated Guided Vehicles in Real-time," Technische Universität Berlin, Fakultät Mathematik und Naturwissenschaften, Institut für Mathematik, No. 039/2007, dated Oct. 10, 2007, in 16 pages.
Vivaldini et al., "Robotic Forklifts for Intelligent Warehouses: Routing, Path Planning, and Auto-localization," IEEE, dated 2010, in 6 pages.
Vivaldini et al., "Automatic Routing System for Intelligent Warehouses," IEEE, dated Feb. 28, 2010, in 6 pages.
Order Denying Petitioner Request for Rehearing for Inter Partes Review of U.S. Pat. No. 9,796,080, *Autostore System Inc. v. Ocado Innovation Limited*, Inter Partes Review No. IPR2021-00798, dated Feb. 17, 2022, in 3 pages.
Amended Joint Claim Construction and Prehearing Statement, *Ocado Innovation Ltd. and Ocado Solutions Ltd. vs. Autostore AS and Autostore Systems, Inc.*, Case No. 1:21-cv-00041-JL, dated Aug. 5, 2022, in 51 pages.
Defendant's Reply Claim Construction Brief, *Ocado Innovation Ltd. and Ocado Solutions Ltd. VS. Autostore AS and Autostore Systems, Inc.*, Case No. 1:21-cv-00041-JL, dated Aug. 22, 2022, in 66 pages.
Plaintiff's Responsive Claim Construction Brief, *Ocado Innovation Ltd. and Ocado Solutions Ltd. VS. Autostore AS and Autostore Systems, Inc.*, Case No. 1:21-cv-00041-JL, dated Aug. 22, 2022, in 64 pages.
Transcript of Markman Hearing—Morning Session, *Ocado Innovation Ltd. and Ocado Solutions Ltd. VS. Autostore AS and Autostore Systems, Inc.*, Case No. 1:21-cv-00041-JL, dated Sep. 29, 2022, in 115 pages.
Transcript of Markman Hearing—Afternoon Session, *Ocado Innovation Ltd. and Ocado Solutions Ltd. vs. Autostore AS and Autostore Systems, Inc.*, Case No. 1:21-cv-00041-JL, dated Sep. 29, 2022, in 130 pages.
Assented-To Motion for Leave to File Supplemental Responses to Certain of the Court's Markman Hearing Questions and Plaintiff's Proposed Supplemental Responses, *Ocado Innovation Ltd. and Ocado Solutions Ltd. vs. Autostore AS and Autostore Systems, Inc.*, Case No. 1:21-cv-00041-JL, dated Oct. 12, 2022, in 25 pages.
Defendant's Response to Plaintiff's Supplemental Responses to Certain of the Court's Markman Hearing Questions, *Ocado Innovation Ltd. and Ocado Solutions Ltd. vs. Autostore AS and Autostore Systems, Inc.*, Case No. 1:21-cv-00041-JL, dated Oct. 20, 2022, in 31 pages.
Declaration of Boloori in Support of Defendant's Opposition to Plaintiff's Motion to Strike with Chart Summarizing Certain Plaintiff Statements in Claim Construction Briefing and Motion to Strike, *Ocado Innovation Ltd. and Ocado Solutions Ltd. vs. Autostore AS and Autostore Systems, Inc.*, Case No. 1:21- cv-00041-JL, dated Dec. 9, 2022, in 15 pages.
Plaintiff's Supplemental Claim Construction Brief, *Ocado Innovation Ltd. and Ocado Solutions Ltd. VS. Autostore AS and Autostore Systems, Inc.*, Case No. 1:21-cv-00041-JL, dated Jan. 5, 2023, in 6 pages.
Defendant's Supplemental Brief in Response to Plaintiff's Supplemental Claim Construction Brief, *Ocado Innovation Ltd. and Ocado Solutions Ltd. vs. Autostore AS and Autostore Systems, Inc.*, Case No. 1:21-cv-00041-JL, dated Jan. 10, 2023, in 9 pages.
Stipulation of Dismissal with Prejudice Pursuant to Settlement Agreement, *Ocado Innovation Ltd. and Ocado Solutions Ltd. vs. Autostore AS and Autostore Systems, Inc.*, Case No. 1:21-cv-00041-JL, filed Jul. 26, 2023, in 3 pages.

\* cited by examiner

SYSTEMS AND METHODS FOR ORDER PROCESSING

This application is a continuation application of U.S. patent application Ser. No. 17/951,865, filed on Sep. 23, 2022, which is a continuation application of U.S. patent application Ser. No. 16/786,333, filed on Feb. 10, 2020, which is a continuation application of U.S. patent application Ser. No. 15/790,704, filed on Oct. 23, 2017, which is a continuation application of U.S. patent application Ser. No. 14/899,367, filed on Dec. 17, 2015, which is a U.S. National Stage application based on International Patent Application No. PCT/IB2014/062165, filed on Jun. 12, 2014, which claims priority to UK Patent Application No. 1310784.2, filed on Jun. 17, 2013, the entireties of which are hereby incorporated by reference.

The invention relates to systems and methods for order processing. More specifically but not exclusively the disclosure herein relates to automated order fulfillment systems. In particular, the disclosure provides improved systems and methods for the handling, or manipulation, of containers in fully or semi-automated storage and retrieval systems.

Various forms of both fully and semi-automated order processing and fulfillment systems are known. They, and the various components they comprise, may take many forms.

In some forms of goods-to-man picking systems, for example, bins or other containers containing inventory and/or other items may be stored within, and retrieved from, a storage and retrieval system, in order to facilitate picking of items from the containers at picking stations. Items picked from storage containers may be placed into delivery containers, which are often of different type(s) than those used to store items, and which are provided by systems or other sources outside the storage system.

Orders assembled for delivery frequently comprise multiple delivery containers. Individual containers, once they have been suitably filled with picked items, are typically set aside in separate order sortation or handling systems until all required delivery containers for an order or a whole delivery vehicle are ready. At that time the multiple containers required to fill the order are assembled and provided to a dispatch facility for loading or delivery.

Empty delivery containers may be returned, following delivery, to the sorting or dispatch area and fed back into the separate order sortation and handling system for re-use. In other embodiments, delivery containers may be in the form of cartons, which are not returned.

While the use of separate order sortation and handling systems can work well for relatively small installations, handling up to, for example, a few thousand bin retrievals per hour, and either relatively few customer orders per hour or relatively few items per customer order, with large systems, involving tens of thousands of bin retrievals per hour or more, and hundreds or thousands of customer orders, each comprising tens of different items, this can become a bigger problem, requiring extensive conveyor systems for transport and sortation of Order Containers.

For this and other reasons there is considerable room for improvement in the efficiency of order processing systems, and components thereof, including storage and retrieval systems and the handling of storage and delivery containers.

Fully- and semi-automatic goods storage and retrieval systems, various aspects of which may sometimes be referred to as "order fulfillment," "storage and retrieval," and/or "order picking" systems, can be implemented in a wide variety of types and forms. One manner of providing access to goods stored for fully- and/or semi-automatic retrieval, for example, comprises placement of goods, which may be of any desired type(s), in bins or other containers (hereinafter referred to generically as containers), and stacking and/or otherwise disposing the containers vertically in layers, and optionally in multiple columns and/or rows, or in racking systems, such that individual containers may be accessible by wholly or partially-automated container retrieval systems. Such systems can for example comprise various combinations of containers; container stack support mechanisms, which may include mechanical devices such as frames and/or free-standing, stackable, and/or otherwise specialized container(s); and automated or semi-automated (i.e., "robotic") retrieval devices, such as load handlers which may for example operate on grids, racking or other forms of rails, using wheels, and/or on other forms of mechanical traveling devices.

Upon receipt of an order from a customer for multiple items stored in a storage and retrieval system, fully or semi-automated container handlers may retrieve storage containers containing relevant items from a grid, racking, or other ordered arrangement of storage containers, and deliver them to fully or semi-automated picking stations. At the picking stations, items may be removed from the storage containers and placed, typically with other items, in delivery containers.

The invention can in some examples, provide a variety of improvements in the storage and handling of storage and delivery containers within such order fulfillment systems.

In various aspects, for example, the invention provides methods of operating an order processing system which comprises a goods storage and retrieval system, the goods storage and retrieval system comprising a grid, racking, or other ordered disposition of containers. Such methods include storing within the grids or other ordered dispositions distinct sets of containers, the distinct sets configured for storage of items within the grid or racking, and for delivery of the items to customers who have ordered them. By storing both types of containers within the grid or racking, significant efficiencies can be realized in a number of ways, including for example more efficient use of floor space, more rapid and efficient handling, or manipulation, of containers by robotic load handlers, and fewer moving parts, which may result in lower investment and lower operating costs compared to prior art systems.

In some embodiments and aspects of the invention, further efficiencies may be realized by storing one or more delivery containers within storage containers, and storing such combined container sets within the storage and retrieval grid, racking, or other ordered arrangement, along with storage containers containing items to be used in filling customer orders.

In accordance with further aspects of the invention, efficiencies may be realized by using a single type of container for both storage of items within a storage and retrieval system and for delivery. Suitable containers are preferably strong and durable enough for both handling by the storage and retrieval system, and any other components of an order processing system, and for transportation, delivery, etc., and light enough for efficient transportation and delivery.

In further aspects, the invention provides storage containers which may be specially configured to facilitate storage, and rapid and efficient removal, of delivery containers. For example, such storage containers may comprise holes, or other apertures or structural features, which enable automated container-handling devices to rapidly lift or otherwise remove filled or empty delivery containers from storage containers in which they have previously been placed.

In various further aspects, the disclosure provides corresponding systems and devices, and logic structures such as machine-executable coded instruction sets for implementing such systems, devices, and methods.

In accordance with an aspect of the present disclosure, there is provided a system for managing shipment containers. The system includes a storage-and-retrieval system and at least one processor. The storage-and-retrieval system includes: a structural framework defining a grid of storage locations configured for receiving a plurality of containers; a plurality of robotic load handlers for retrieving containers from any one of the storage locations; and at least one rail arranged about the grid to enable access to each of the storage locations by at least one of the plurality of robotic load handlers. The least one processor is configured to: generate signals for instructing or controlling at least one of the plurality of robotic load handlers to store, in the storage and retrieval system, storage containers containing stored items; generate signals for instructing or controlling at least one of the plurality of robotic load handlers to retrieve from the storage and retrieval system at least one container containing stored items for delivering the retrieved at least one container to an order picking station; and generate signals for instructing or controlling at least one of the plurality of robotic load handlers to store at least one delivery container containing at least one picked item in the storage and retrieval system.

In some examples, each of the at least one delivery container are stored in a storage container for storage in at least one of the storage locations.

In some examples, the at least one processor is configured to generate signals for instructing or controlling at least one of the plurality of robotic load handlers to store fully or partially-picked delivery containers in the storage and retrieval system.

In accordance with an aspect of the present disclosure, there is provided a method of operating an order processing system (1000) comprising a goods storage and retrieval system (400). The method includes: using at least one robotic load handler, storing in at least one of a plurality of storage locations in the storage and retrieval system (400) a plurality of storage containers (10, 70) containing stored items; using the at least one robotic load handler, storing in at least one of the plurality of adjacent stacks (400) a plurality of delivery containers (10, 80); and using the at least one robotic load handler, retrieving from at least one of a plurality of storage locations a plurality of containers (10) comprising at least one of the delivery containers (10, 80), and delivering the retrieved containers (10) to an order picking station (4).

The invention will now be described with reference to the following diagrammatic drawings in which like references are intended to refer to like or corresponding parts.

FIGS. 1, 2, and 7 are schematic flow diagrams illustrating aspects of processes and systems in accordance with the invention.

Preferred embodiments of methods, systems, and apparatus suitable for use in implementing the invention are described through reference to the drawings.

Figure 1:
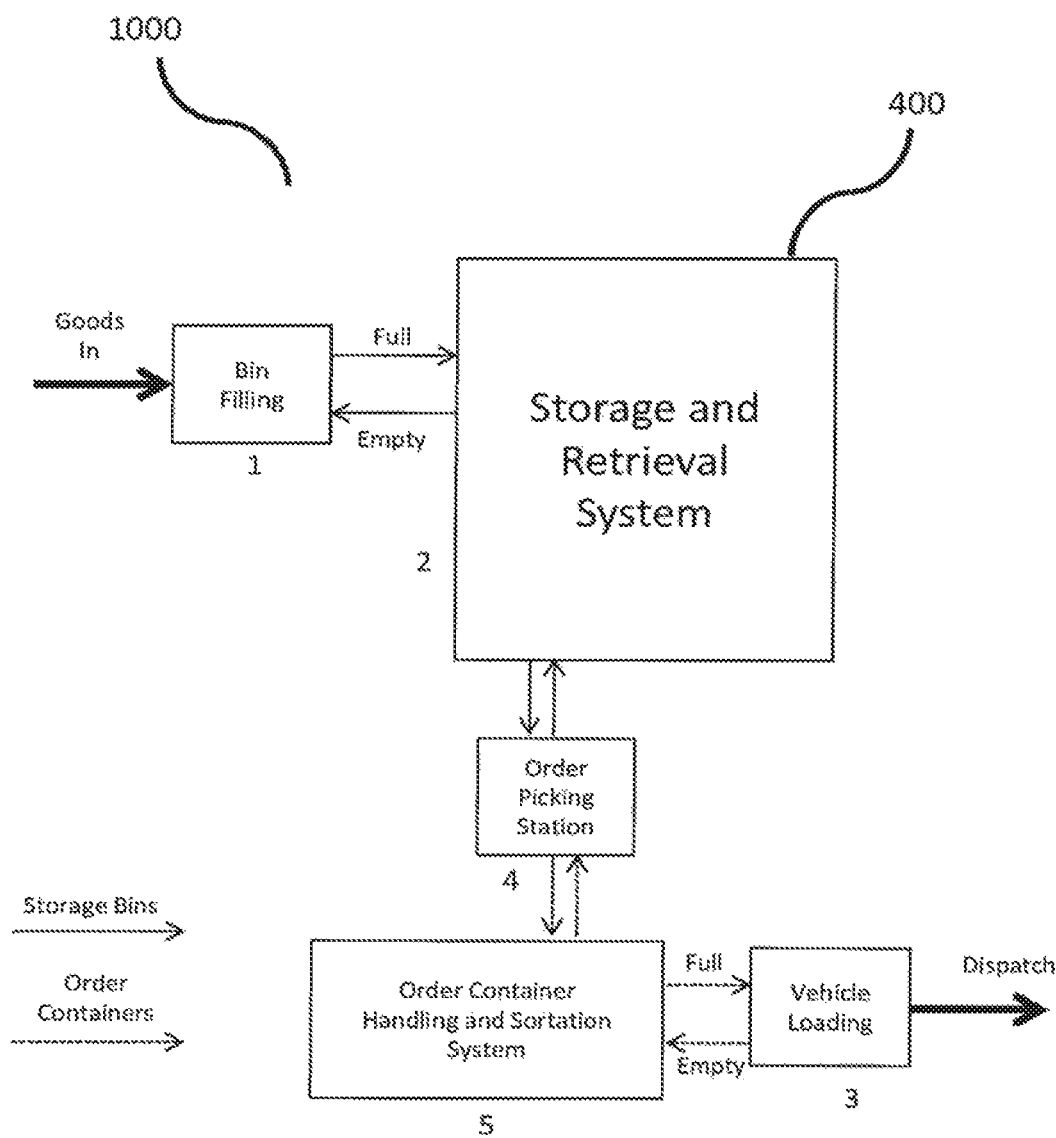

One of the most significant applications of storage and retrieval systems in accordance with the invention is in the fully or semi-automated processing of orders, as for example through their use as components 2 of automated order processing or fulfillment systems 1000 such as that shown in FIG. 1.

In the embodiment shown in FIG. 1, an order fulfillment system 1000 comprises bin or container filling station 1; storage and retrieval system 2, 400; a plurality of order picking stations 4; an order container handling and sortation system 5; and dispatch facility(ies) 3. As will be understood by those skilled in the relevant arts, various components of such a system 1000 can be configured in any of a wide variety of ways, using many different types of devices and processes, in various combinations. Moreover, such systems and processes may be used for the sorting, storage, and delivery of any type(s) of commodities, including for example groceries and/or other office, household and consumer items.

It will also be understood by those skilled in the relevant arts that while various aspects of the process(es) and system(s) shown in FIG. 1 are illustrated using separate functional or schematic boxes, in various embodiments, physical, logical, and other aspects of the system(s) 1000 and function(s) depicted can be combined or otherwise shared in a wide variety of forms.

Bin filling or restocking station(s) 1 and associated process(es) can provide any aspect(s) of order processing system(s) 1000 that enable pallets and/or other multi-packs of inbound items to be separated and placed, individually or in groups, into separate containers 10 for storage in grid-based, rack-based, or other types of storage and retrieval system(s) 400. Such processes can be performed using any suitably-configured fully or semi-automated system(s), using for example various type(s) of conveyors, trolleys, robotic devices, etc., and/or can be performed manually by human workers. In various embodiments, restocking stations 1 can include single or plural pick stations wherein one or more palletized, boxed, or otherwise packaged item sets are picked and placed into initially empty or partly filled containers 10.

Storage and retrieval (sub)system(s) 400 can include any machine(s), device(s), infrastructure or arrangement(s) suitable for fully or semi-automatically storing and retrieving containers 10 containing one or more items in accordance with the disclosure herein. Such systems provide means for storing such containers in, for example, grids comprising multiple stacks, and for storing, retrieving, and/or otherwise accessing containers stored in such stacks, as described herein; or by any other means of storage and retrieval such as a racking system serviced by cranes or shuttles.

Order picking station(s) 4 can include any types or forms of system(s) suitable for receiving containers 10 of items retrieved by storage and retrieval system(s) 400, and enabling picking of items therefrom, for placement in delivery containers 10, 80. Such system(s) 4 can, for example, include various types and form of conveyor or trolley-based systems, wherein containers 10 can be loaded on conveyor(s) or picking trolley(s) for transport to picking areas, for automated and/or manual removal of items and to be placed in delivery or other order-assembly containers 10, 80.

Order container handling and sortation system(s) 5 can include any types or forms of system(s) suitable for providing delivery containers 10, 80 to order picking stations 4, for filling with items required to complete orders; for holding, storing, and sorting containers intended to form parts of orders, and particularly orders which require multiple containers for filling; and for providing containers 10, 80 constituting orders ready for delivery to dispatch facility(ies) 3, where they can be loaded onto vehicles or otherwise prepared for delivery.

Dispatch facility(ies) 3 can include any types or forms of system(s) suitable for accepting delivery container(s) 10, 80 from order container handling and sortation system(s) 5; providing order container sets for vehicles or other delivery apparatus as appropriate; for receiving empty delivery containers 10, 80 following delivery of orders, and for returning empty delivery containers 10, 80 to order container handling and sortation system(s) 5 for refilling at order picking station(s) 4.

Aspects of order processing or handling systems 1000, including storage and retrieval system(s) 400, can be implemented using components provided by manufacturers such as Autostore™, Cimcorp™, Knapp OSR™, Dematic Multishuttle™ and others.

As previously noted, in its various aspects the invention provides a variety of improvements in efficiency. For example, as shown in FIG. 2, the storage and other manipulation of both storage containers 10, 70 and delivery containers 10, 80 (see for example FIGS. 6 and 8) within storage and retrieval system(s) 400 can reduce and even eliminate the need for separate order container handling and sortation system(s) 5 as well as the conveyor systems required to connect these separate systems.

For example, in some embodiments, a unified storage and retrieval system may be implemented where load handlers or other robots can access all parts of the storage-and-retrieval system (and thereby all storage containers and delivery containers) without additional cranes and/or conveyors.

In a large picking system, for example in a large grocery picking system, the delivery container handling transport, storage and sortation system may account for 25-35% of the equipment investment and may take up 20-25% of the floor space. The present invention can in some examples reduce these numbers by 70-80%. Associated energy, maintenance and spare parts cost may also fall by similar proportions.

Figure 2:
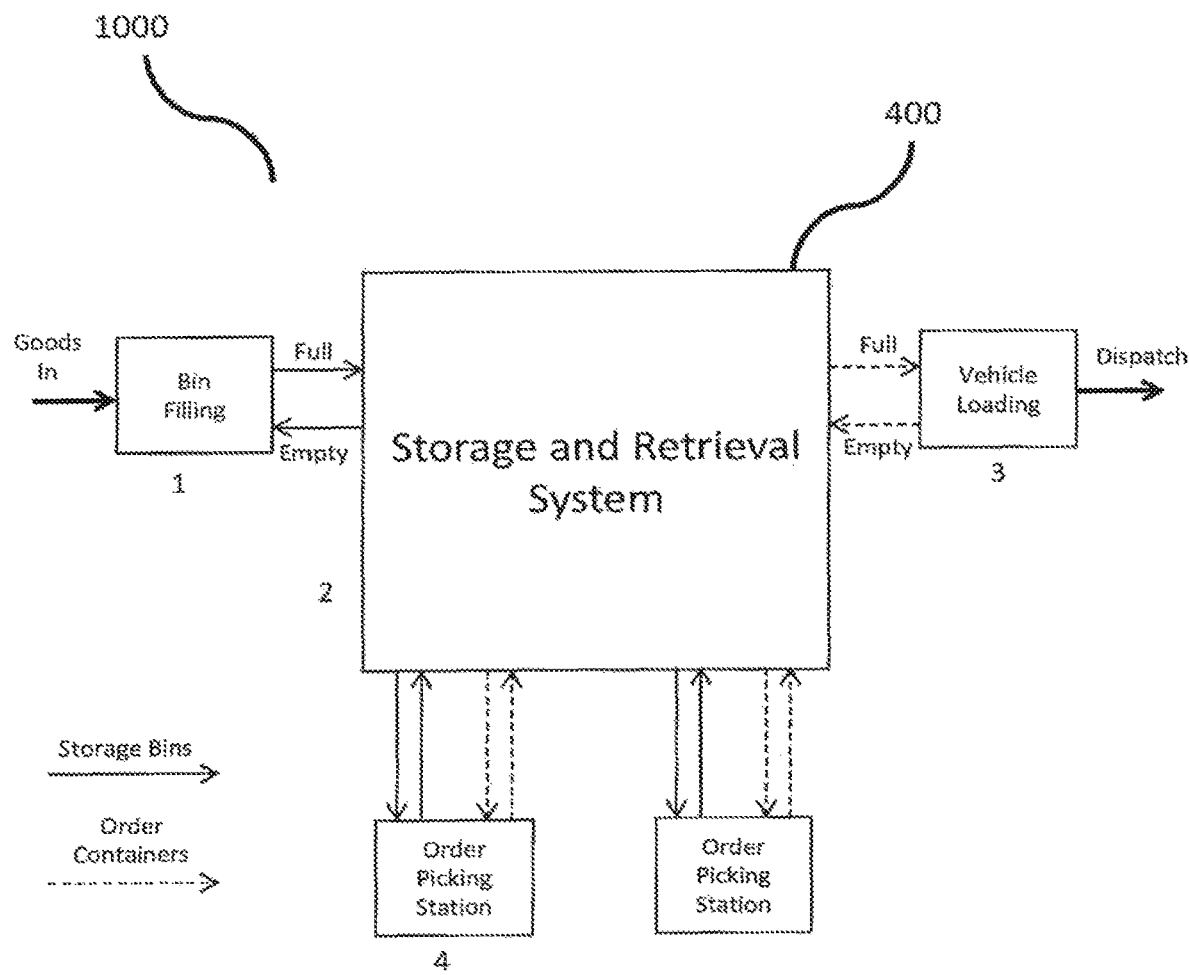

In the embodiment shown in FIG. 2, a storage and retrieval system 400 receives returned, empty order containers 10, 80 directly from dispatch facility(ies) 3, and stores them until required for order picking processes at order picking station(s) 4. Alternatively, the order containers can comprise cartons, bags or similar which can be erected or otherwise introduced directly at the pick station.

Order picking station(s) 4 receive both storage containers 10, 70 containing ordered items, and empty and/or partially-filled delivery containers 10, 80 from the storage and retrieval system 400, and return both wholly or partially-depleted storage containers 10, 70, and order containers 10, 80 containing ordered, freshly-picked items to the storage and retrieval system 400. Individual order containers 10, 80 containing sufficient items to be ready for delivery may be held in a storage and retrieval system 400 until all such containers associated with an order are ready for delivery.

When all items required to fulfill an order or a vehicle full of orders have been placed in one or more delivery containers 10, 80, the storage and retrieval system 400 can retrieve the delivery containers 10, 80, and provide them as a set to a dispatch facility 3 for loading onto delivery vehicle(s), etc., or otherwise processing them for delivery. In some examples, delivery containers 10, 80 can be alternatively or additionally retrieved for dispatch based on shipment schedules, to maintain workloads at a dispatch station, or during periods of reduced activity of robotic load handlers.

Empty storage containers 10, 70 can be returned by order picking station(s) 4 to the storage and retrieval system 400, after all their contents have been picked, held within the storage and retrieval system 400 until required by a bin filling station 1, and when required returned by storage and retrieval system 400 to bin filling station 1 for refilling.

Thus, by storing and otherwise handling, or manipulating, both storage containers 10, 70, and order or delivery containers 10, 80; and by holding, sorting, and delivering delivery container sets corresponding to filled orders to dispatch facilities 3, storage and retrieval system 400 can fill all container storage handling processes previously provided by separate order container handing and sortation system(s) 5, and thereby reduce or eliminate the need for such separate order container handling and sortation system(s) 5, with corresponding improvements in the efficient use of floor space and other facilities, including lighting, heating, air conditioning, machine maintenance, etc., as for example suggested by comparison of FIGS. 1 and 2.

Systems and methods in accordance with the invention can, in some examples, be advantageously applied to the operation of storage and retrieval systems 400 of any type, including for example grids of stacked containers 10. As shown for example in FIGS. 3-5, such systems can comprise grids 200 of containers 10 stored in rows 100 and columns 120 of stacks 30. Specific container(s) 10 required for fulfillment of orders may be accessed by automated devices such as robotic overhead load handlers 40, operating on rails 160 formed by frames used to support the containers and thereby define the grid 200. In some examples, rails 160 can include separate or independent structures for creating paths over which the load handlers can move.

Rails 160, along which the load handlers 40 are configured to move, can refer to a single or series of bars or elongate members. Rails can include single rails, double rails, track(s), guideway(s), grove(s), or any other structure along which the load handlers 40 can operate.

In any embodiment described herein, the storage and retrieval system 400 can include rack structures serviced by crane and/or shuttle systems for storing containers 10, 70.

As mentioned above, it is possible to arrange the storage system in many different ways. For clarity and simplicity the following description will focus on one of those ways, namely with bins stacked on top of each other in a grid structure. In embodiments comprising stacked storage containers 10, 70, as discussed further below, it can be advantageous for the storage containers 10, 70 to be strong enough to support stacks many containers high.

Examples of operations of a system 1000, and associated aspects of the invention, can be described through reference to FIGS. 2-5. At 1, palletized or other batches of items arrive at a container filling or restocking station. For example, pallet(s) items may be removed from a truck or other means of conveyance at an order processing/fulfillment center, and be wheeled into one or more bin filling station(s) 1 comprising tables, conveyors, trolleys, etc. for holding a plurality of bins or containers 10, 70. Upon removal or opening of any packaging, one or more product(s) or other items may be placed into bins or other storage containers 10, 70.

As desired stocking of containers 10, 70 is completed, containers may be transferred to storage in a storage and retrieval system 400, as for example by conveyor, and stored therein until needed for fulfillment of an order. For example, a container 10, 70 may be brought to a port 70, engaged by a moveable overhead load handler 40 or a bottom-access lifter/clamp (not shown), and stored within a stack 30 of the grid 200 until needed for further order fulfillment processes.

At the same time, or at any other desired time, one or more empty and/or partially-filled order or delivery containers 10, 80 may be provided to storage and retrieval system 400, and stored therein until needed at order picking station(s) 4 for the preparation of orders. For example, using a conveyor, cart, or other device, one or more delivery containers 10, 80 may be brought to a the same or another port 70 of the storage and retrieval system 400, engaged by the same or another moveable overhead load handler 40 or a bottom-access lifter/clamp (not shown), and stored within the same or one or more other stacks 30 of the grid 200 until needed for further order fulfillment processes.

When an order is received for one or more items, or when otherwise desired to pick items required to fulfill an order wholly or in part, a controller associated with an order picking station 4 can request retrieval and delivery to such picking station of any storage containers 10, 70 containing desired items, and one or more delivery containers 10, 80. Such containers may be retrieved from one or more stacks 30 in corresponding portion(s) of grid 200 of the storage and retrieval system 400, and delivered to the identified picking station 4 by, for example being hoisted by an overhead load handler 40, delivered to a port 70, and taken by conveyor to the desired pick station 4.

At the picking station 4, ordered items may be removed from any one or more appropriate storage container(s) 10, 70, and placed into suitable delivery container(s) 10, 80. When a delivery container 10, 80, is appropriately filled with ordered items, it can be returned from the picking station 4 to the storage and retrieval system 400 until ready or otherwise required for delivery to dispatch facility 3.

For example, when an order requires picking of items into multiple delivery containers 10, 80, full or otherwise completed delivery containers 10, 80 may be returned to one or more desired stacks 30 within a grid 200 by one or more load handlers 40, and stored until all required items have been picked into delivery containers 10, 80. At that time, or at any other scheduled or otherwise advantageous time, all delivery containers 10, 80 required for fulfillment of the order may be retrieved, using one or more load handlers 40, and delivered via a port 70 and conveyor to a desired dispatch facility 3, loaded onto one or more vehicles, and delivered.

As previously discussed, returned, empty or partially-filled delivery containers 10, 80 may be returned by the vehicle or other conveyance, following delivery, and returned via conveyor, port 70, and load hander 40, etc., to one or more desired stacks 30 of grid 200.

Containers 10 suitable for use in implementing the various aspects of the invention can comprise any suitable bags, bins, boxes, baskets, pallets, and/or other containers.

As will be understood by those skilled in the relevant arts, the characteristics of suitable storage containers 10, 70 and delivery containers 10, 80 may depend at least partly upon the nature of the order fulfillment systems 1000, and particularly the storage and retrieval systems 400, order picking stations 4, and dispatch facilities 3, with which they are to be used, as well as the nature of items to be stored and delivered, and the means—e.g., truck, aircraft, refrigerated compartment, human courier, etc.—by which they are to be delivered.

Figure 3:
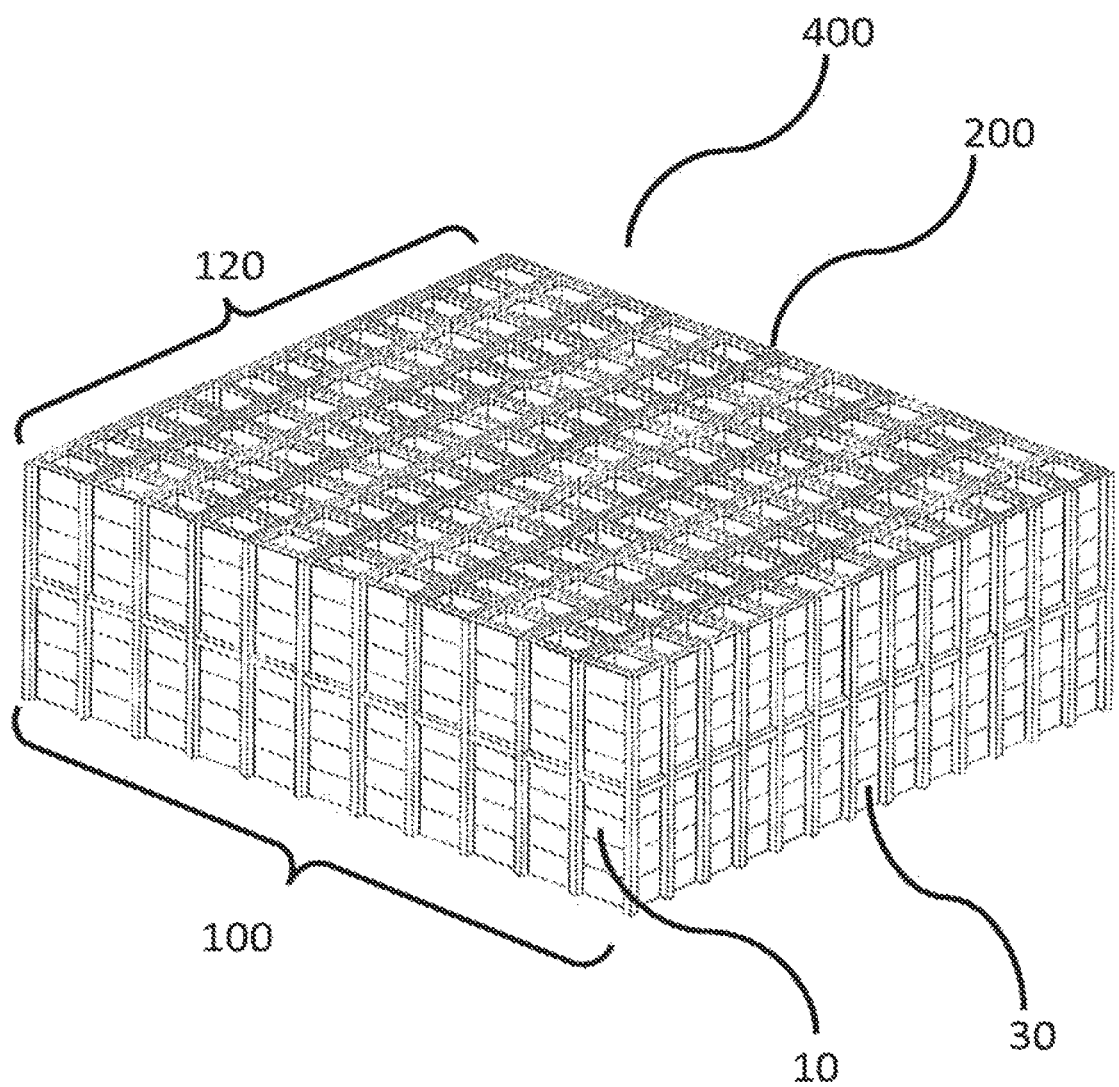
FIGS. 3-5 are schematic diagrams of systems and devices suitable for use in implementing aspects of the invention.
Figure 4:
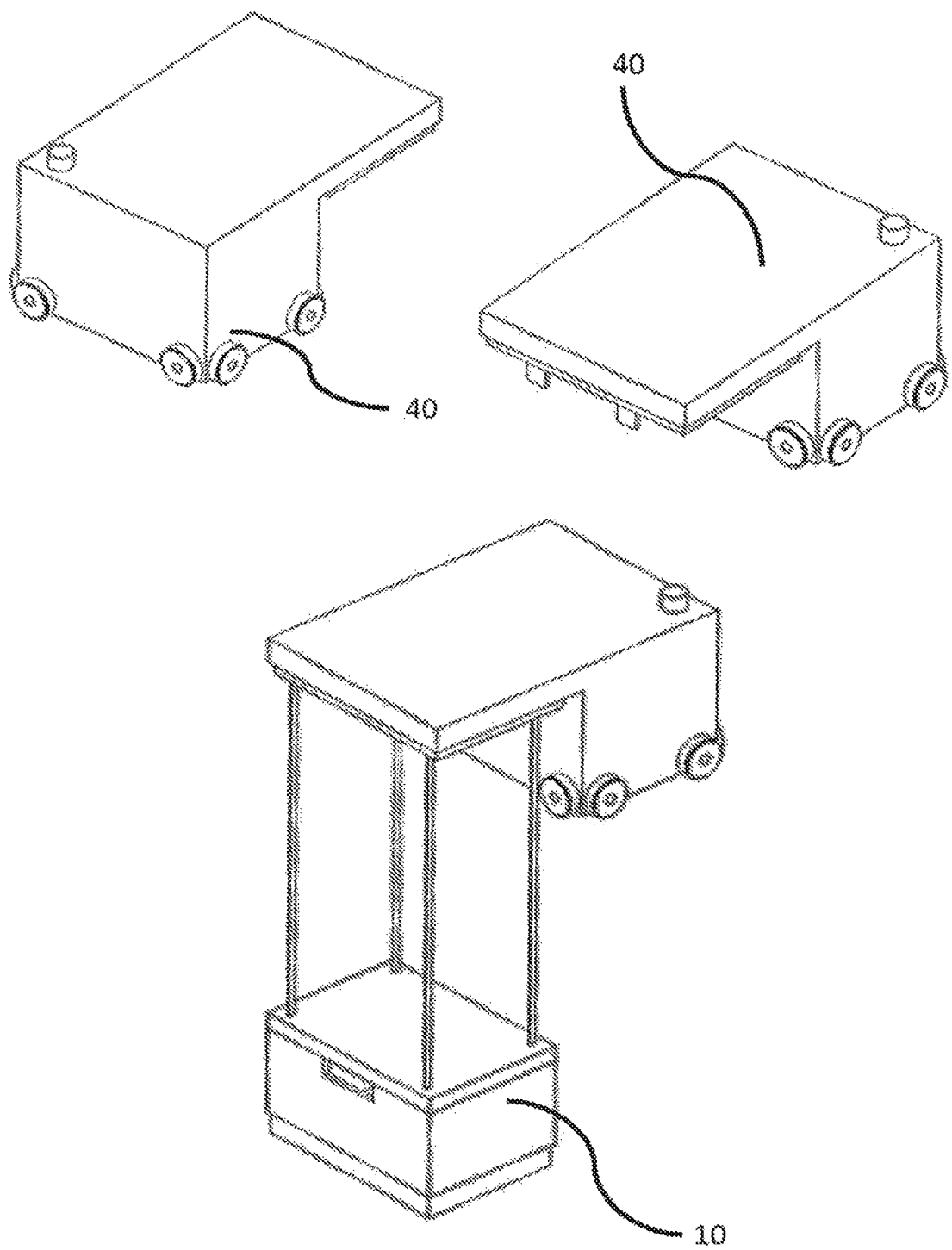
Figure 5:
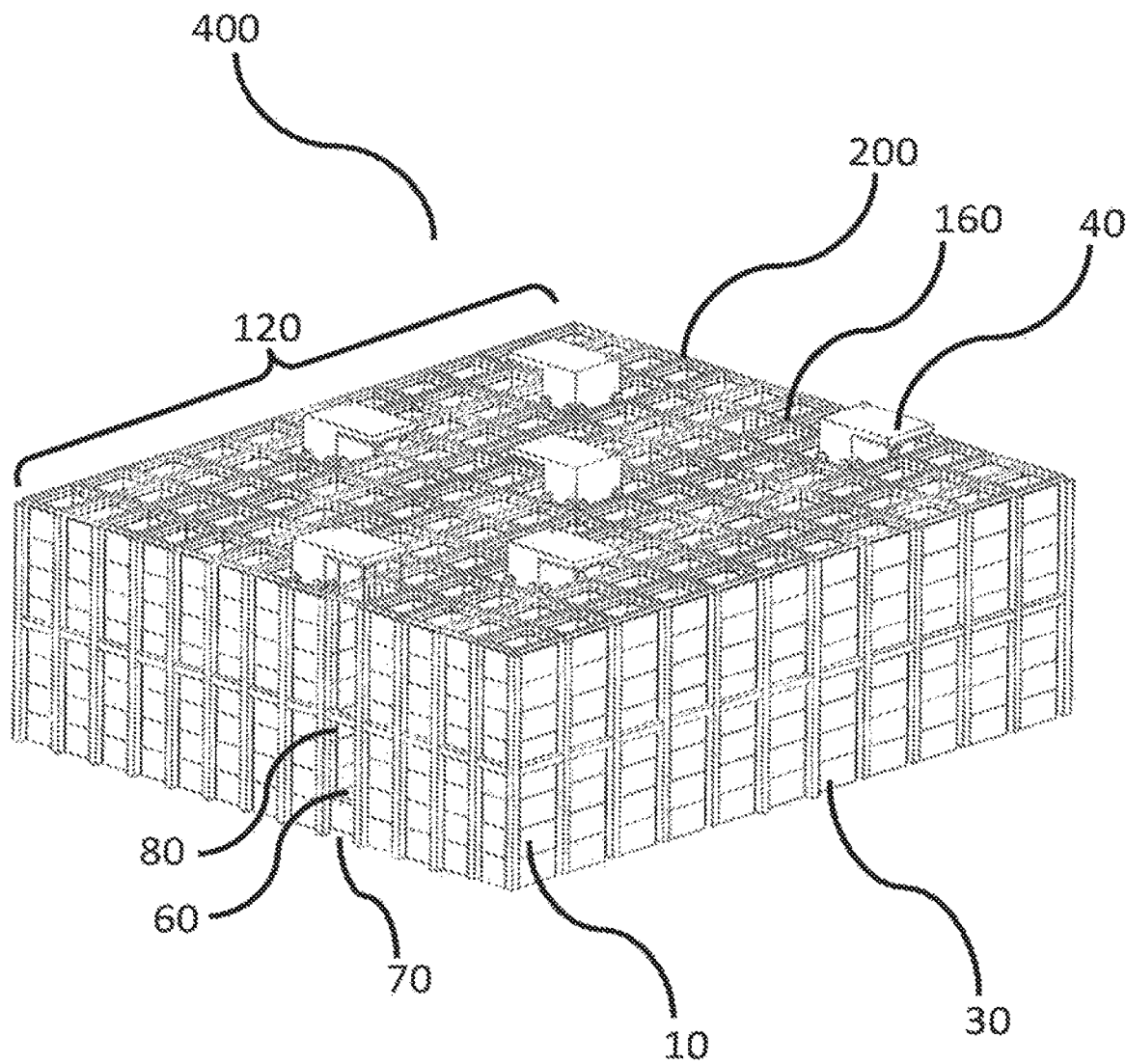

For example, in systems 1000 comprising grid-based automated storage and retrieval systems 400 such as those shown in FIGS. 3-5, storage containers 10, 70 can tend to be relatively heavier, e.g., of heavier thickness or gauge, and/or otherwise sturdier, than delivery containers 10, 80. It can be important, for example, for delivery containers 10, 80 to be strong enough and durable enough to survive extensive handling by the various components of systems 1000, but light enough to be carried by human handlers and/or delivery personnel, and to minimize transportation costs, which costs can depend at least partly on cargo weights. Thus, as will be appreciated by those skilled in the relevant arts, it can be of significant advantage to enable systems 1000, 400 to operate easily and efficiently with one or more types of each of storage containers 10, 70, and delivery containers 10, 80, using systems and methods as described herein.

As previously noted, in embodiments of the invention in which stacks 30 of containers are employed, it can be advantageous for containers 10 to be strong enough to support stacks many containers high. This can be accomplished in any number of suitable ways, including for example by configuring the containers 10 such that stacking loads are carried successfully by the walls of the stacked containers, using for example container walls of suitable thickness and stiffness. Integral and/or built-up stiffeners or reinforcements may also be used advantageously.

As previously noted, in some circumstances significant advantages may be realized by implementing the invention using a single type of container 10 for both storage of items within a storage and retrieval system 400 and for delivery. Suitable containers for such embodiments are preferably strong and durable enough for both handling by the storage and retrieval system 400, and any other components 3, 4, 5, 6, etc., of an order processing system 1000, and for transportation, delivery, etc.; and light enough for efficient transportation and delivery.

Thus in various embodiments the invention provides methods of operating an order processing system (1000) comprising a goods storage and retrieval system (400), the storage and retrieval system (400) comprising a grid (200) of storage locations for receiving containers (10); the method comprising storing in the grid (200) a plurality of storage containers (10) containing stored items; retrieving from the grid (200) one or more containers (10) comprising items to be delivered as a part of an order; removing from one or more of the retrieved containers 10 the items to be delivered as part of an order, and placing the items in another container 10; and delivering the items to a customer delivery location the container in which they have been placed.

Another advantageous feature offered by the invention is the placement of one or more delivery containers 10, 80, within a storage container 10, 70, and the subsequent joint handling of the container combination 90 by system(s) 1000, 400, 4, 3, etc.

It has been observed, for example, that storage containers 10, 70, 80 can need significant strength to enable high stacks 30 of containers 10 within a storage and retrieval system 400. Provision of such strength can add weight to the containers 10, 70, 80 which could restrict the amount of available payload in vehicles used for distribution, and could restrict the ability of humans or machines to handle the containers. In addition, such containers 10, 70, 80 sometimes do not nest, which can make handling of multiple empty bins in a confined space such as a vehicle difficult. Finally, the use of heavy/strong containers 10, 70, etc. adds cost, which can be significant if there is a large number of order containers 10, 80 circulating in the distribution network 1000.

Another aspect of the invention therefore uses a method where, as for example described below, a lighter, cheaper, and optionally nestable or collapsible order container 10, 70 is placed within storage bins 10, 80. This allows the storage and manipulation of order containers 10, 70 within the storage and retrieval system without sacrificing weight, cost, nestability or collapsibility.

Figure 6:
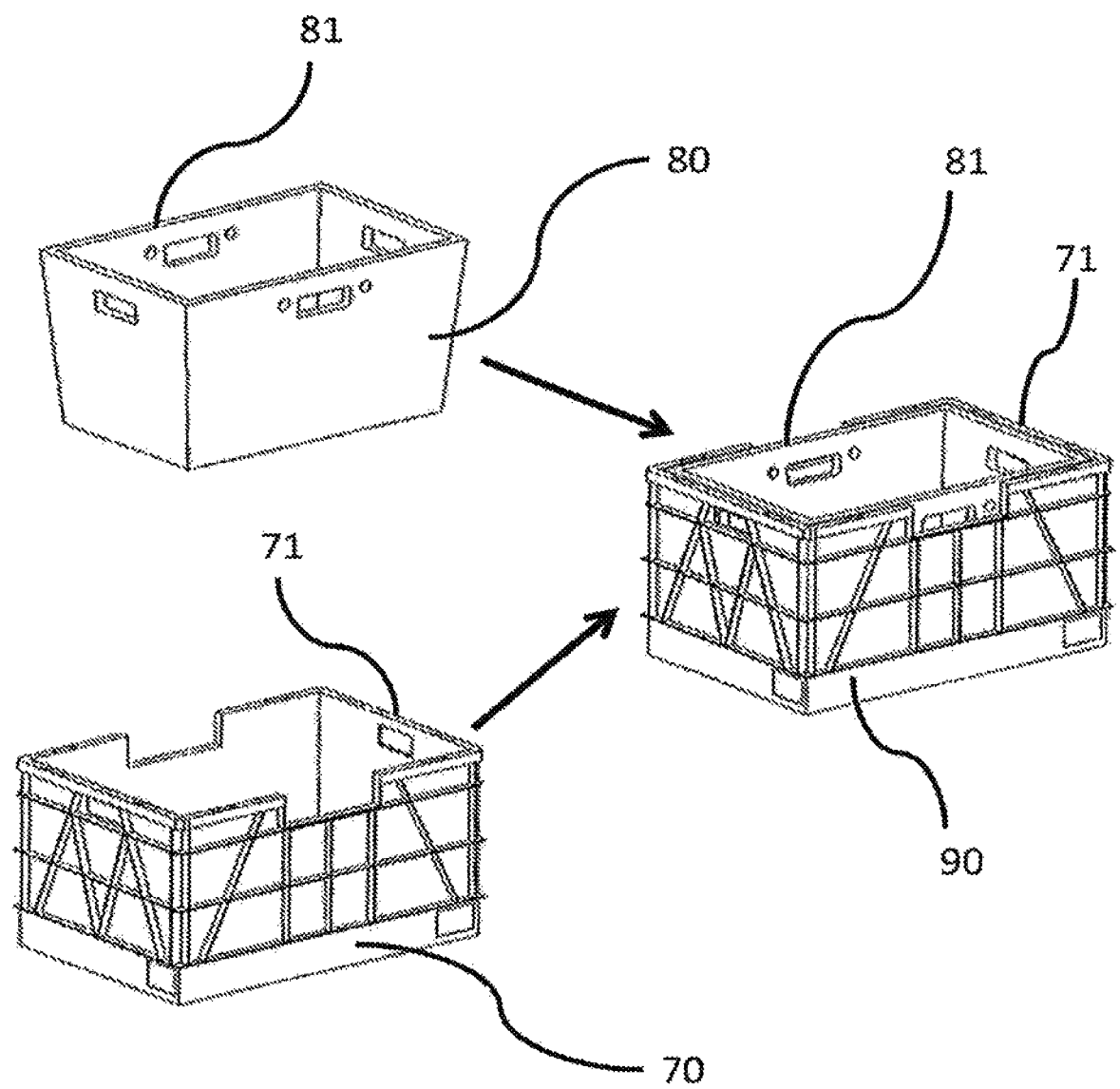
FIGS. 6 and 8 are schematic diagrams of containers suitable for use in implementing aspects of the invention.

For example, as shown in FIG. 6, a delivery container 10, 80 may be placed inside a storage container 10, 70 to form a container combination 90. Suitable configuration of delivery containers 80 for such purposes, by, for example, ensuring that upper edges 81 of deliver containers 80 do not protrude above upper edges 71 of storage containers 70, when placed therein, can allow containers 80 to be stored within grids 200 and/or other forms of storage and retrieval system(s) 400, and otherwise handled by systems 1000, 400, 4, 3, etc., in the same manner as containers 70, without requiring them to be built to the same stiffnesses, weights, strengths, etc.

One or more pluralities of suitably-configured delivery containers 80 may be stored within single storage containers 70 to form container combinations 90. For example, delivery containers 80 may be provided in nestable configurations, as shown for example in FIG. 6. In addition to allowing multiple delivery containers 80 to be stored within a single storage container 70, the use of nestable delivery configurations can facilitate easier and more efficient handling of delivery containers 80 in other ways—for example, it can be easier for human handlers to carry multiple delivery containers when they are nested, and/or to transport nested delivery containers 80 in trucks and other means of conveyance.

Another means of storing multiple delivery containers 80 in a single storage container 70 is to use multiple types/sizes of delivery containers. For example, two, three, or more paper or other shopping bags or shipping boxes 80 may be stored within one or more delivery containers 80, and the delivery container 80 containing the bags or boxes may be placed within a storage container 70 for further handling. Thus use of shopping bags or shipping boxes 80 in such fashion can enhance customer or other user convenience at the time of assembling and delivering orders, and thereafter.

Figure 7:
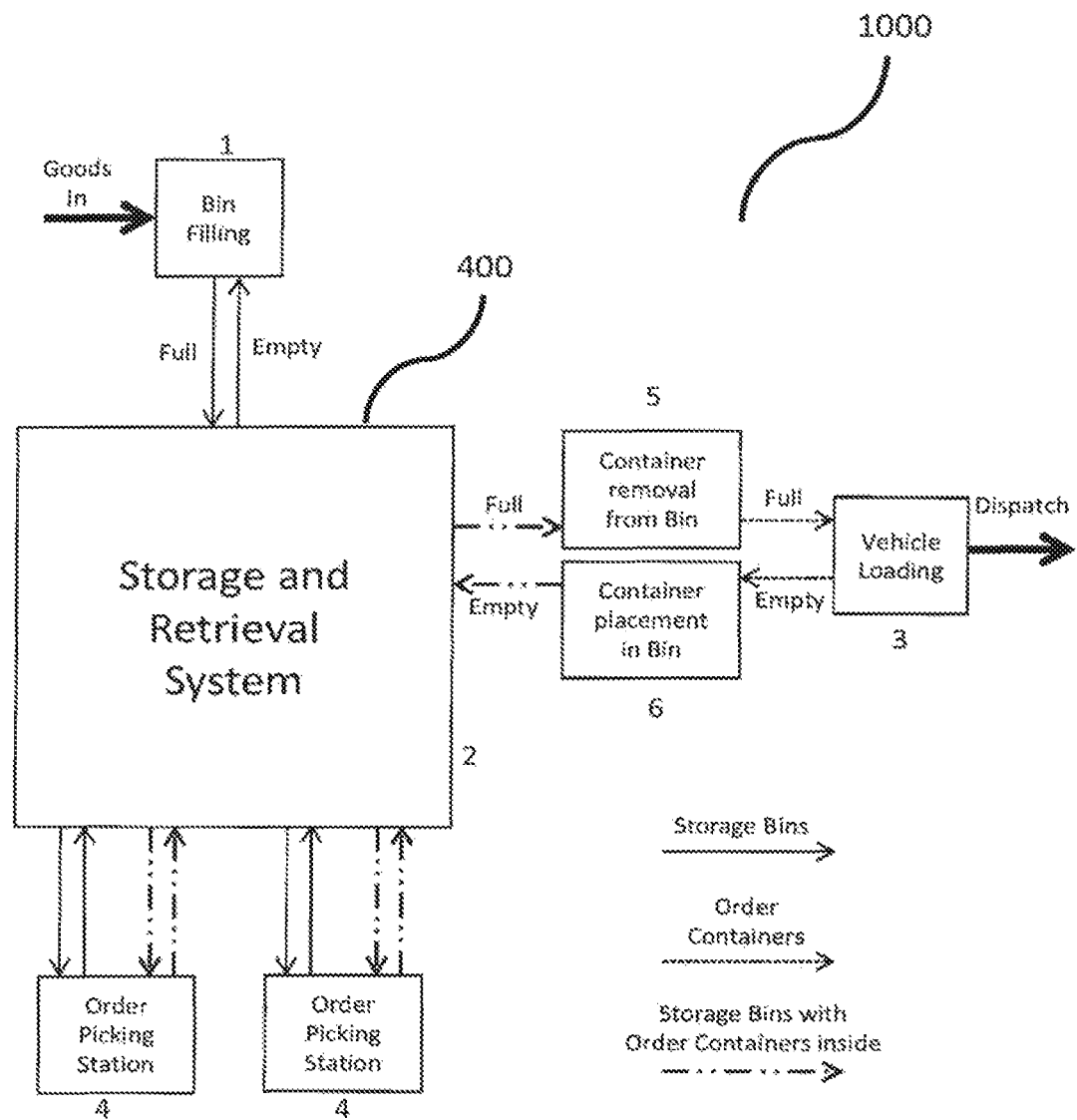

FIG. 7 illustrates further efficiencies enabled by the placement of delivery container(s) 10, 80 within storage containers 10, 70 to created container combinations 90, and means of realizing them.

As shown at 6 in FIG. 7, one or more delivery containers 80 can be placed inside storage containers 80 at dispatch facility 3, or between dispatch facility 3 and storage and retrieval system 400. For example, one or more delivery bin 80 may be placed within each storage bin 70, and optionally one or more shopping or other bags may be placed within such bins; and the resulting container combination(s) 90 can be placed within grid 200 until needed at an order picking station 4. At an order picking station 4, delivery container(s) within a combination 90 may be stocked with items picked from the same or storage containers 70, as described above, and further processed as described for order assembly and delivery. When all delivery container(s) 80 associated with an order have been appropriately filled, and/or at a scheduled or otherwise desired time, the corresponding container combinations 90 can be retrieved by the system 400 and delivered to dispatch facility 3 or other desired location. At 5, filled delivery container(s) 80 can be removed from the combination(s) 90 and loaded or otherwise processed for delivery. As will be appreciated by those skilled in the relevant arts, bins 80 comprising shopping bags 80, etc., can be removed as a unit for further transportation or handling.

Containers 10 suitable for use in implementing the invention can comprise any one or more of a wide range of specialized structural features to enable further gains in handling efficiency.

Figure 8:
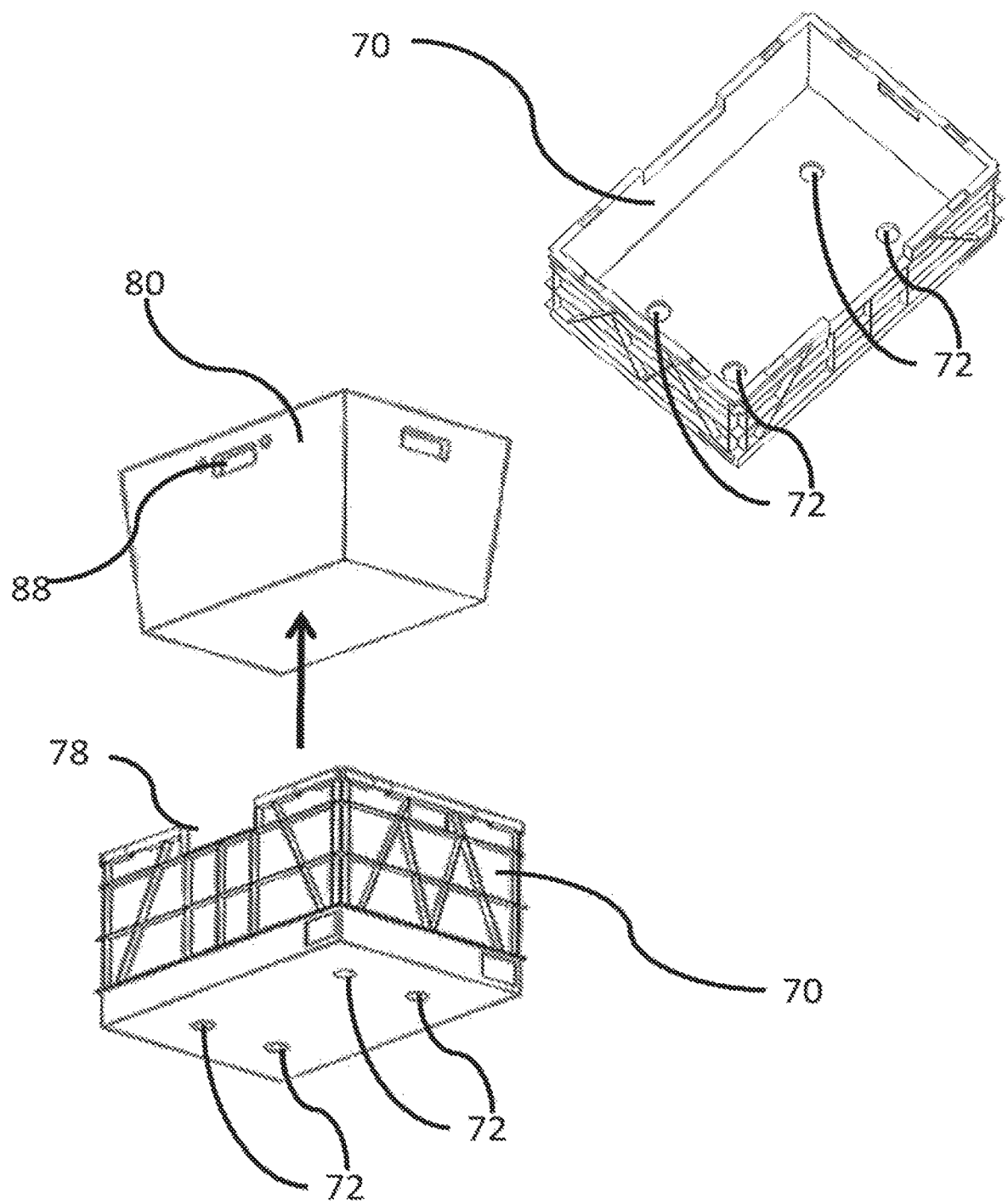

As one example, it can be advantageous in some embodiments to provide storage containers 10, 70 with cutouts, holes (apertures) and/or other structural features 72, as shown for example in FIG. 8, to facilitate fully- or semi-automated removal of delivery containers 80 from storage containers 70. For example, the provision of cutouts, holes or apertures 72 in the bottom of storage containers 70 can be used to enable mechanical lifters or other devices to push upward through the bottom of a container 70 and thus facilitate easy removal of a delivery bin 80 by a human or other operator. As will be understood by those skilled in the relevant arts, a wide variety of lugs, handles, and other structural features 72 may be provided for such purposes.

In some examples, the delivery containers 80 can have one or more handles 88 which can be engaged by one or more mechanisms for placing or removing the delivery container into/from a storage container 70. This mechanism may be used alternatively or in addition to the aperture-enabled or any other mechanism.

As illustrated for example in FIG. 8, the storage containers 70 can include cutouts 78 which extend below the height of the delivery container handles 88 such that the handles can be engaged while the delivery container is removed from or placed into the storage container.

As previously noted, principles of the invention may be applied with particular advantage to both the semi- and/or fully-automated acceptance and fulfillment of orders. Such orders can, for example, include orders entered via the Internet and/or other public and private communications networks.

As will be further understood by those skilled in the relevant arts, significant advantage may be realized through the full or partial automation of any of the processes described herein, or portions thereof. Some examples of such automation is provided in FIGS. 9 to 21.

Figure 9:
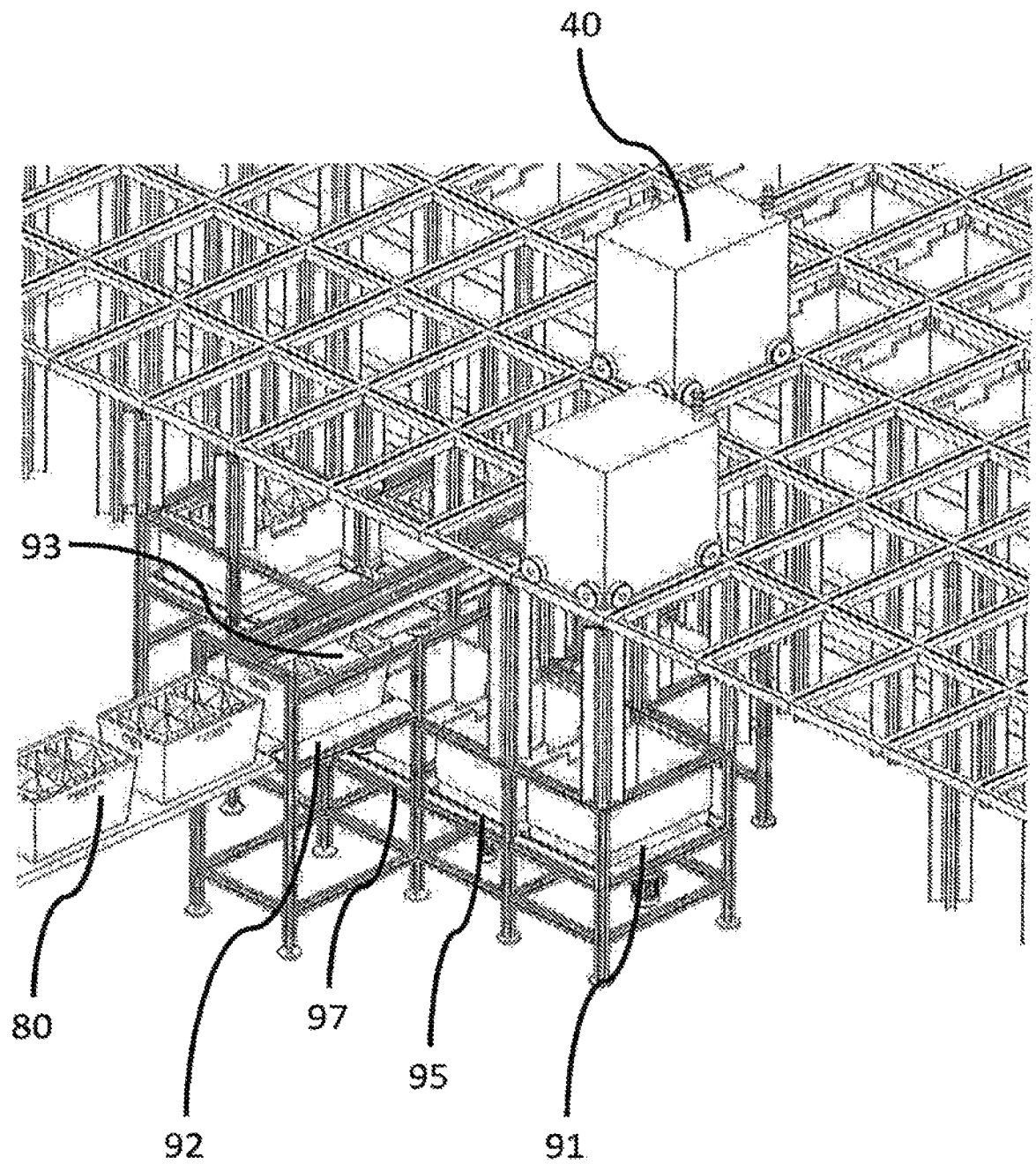
FIGS. 9-20 are schematic diagrams of systems and devices suitable for use in implementing aspects of the invention.
Figure 10:
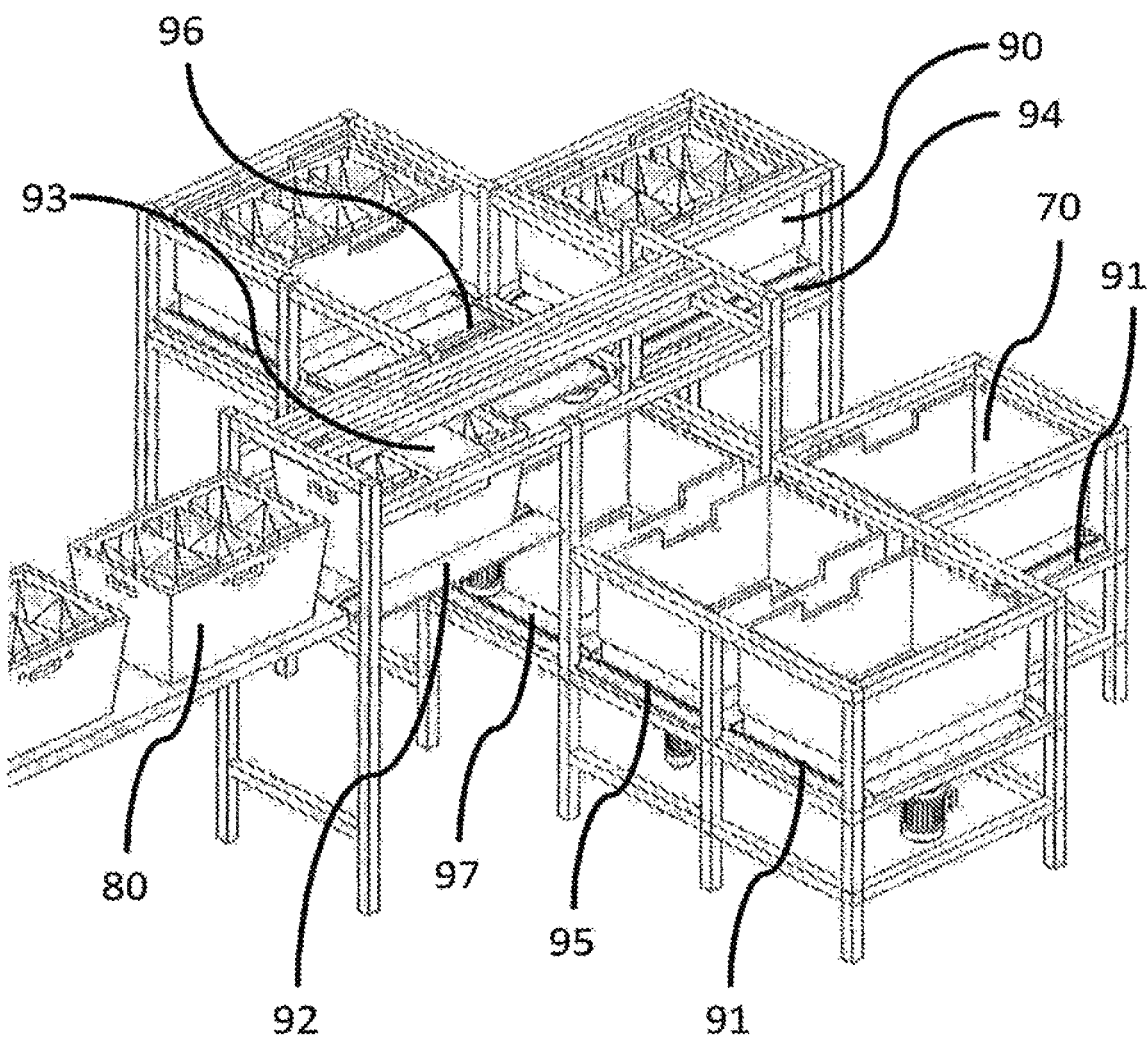
Figure 11:
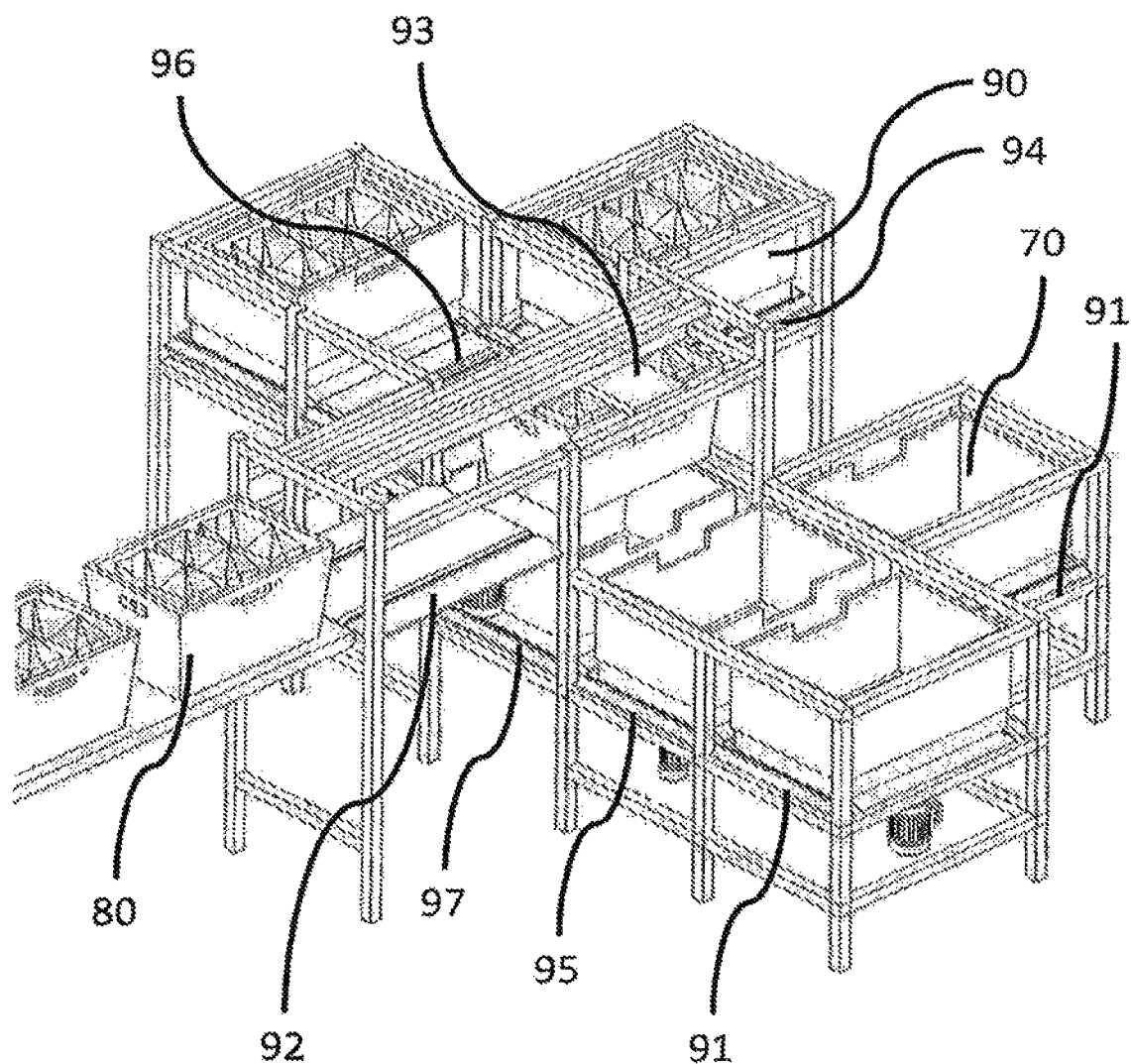
Figure 12:
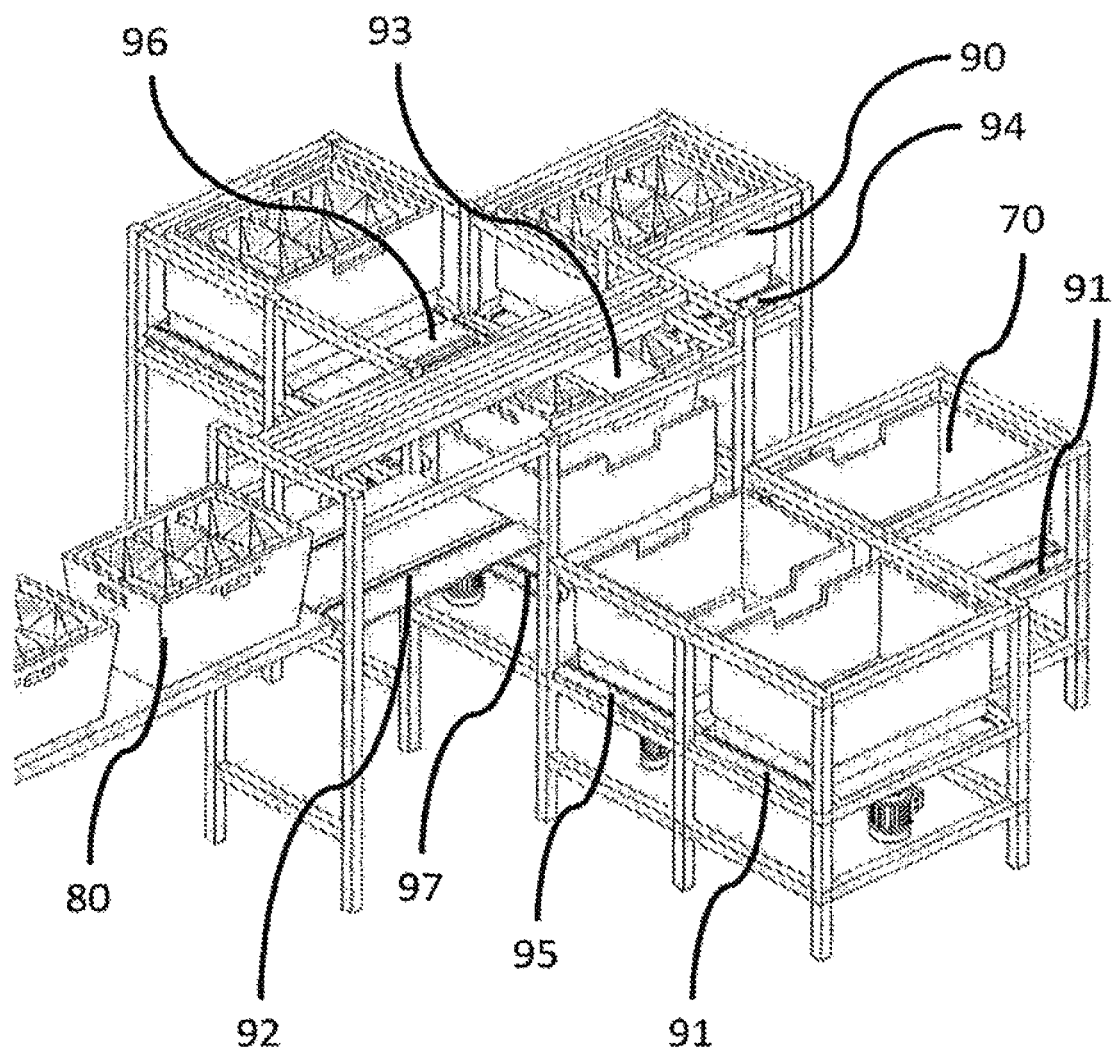
Figure 13:
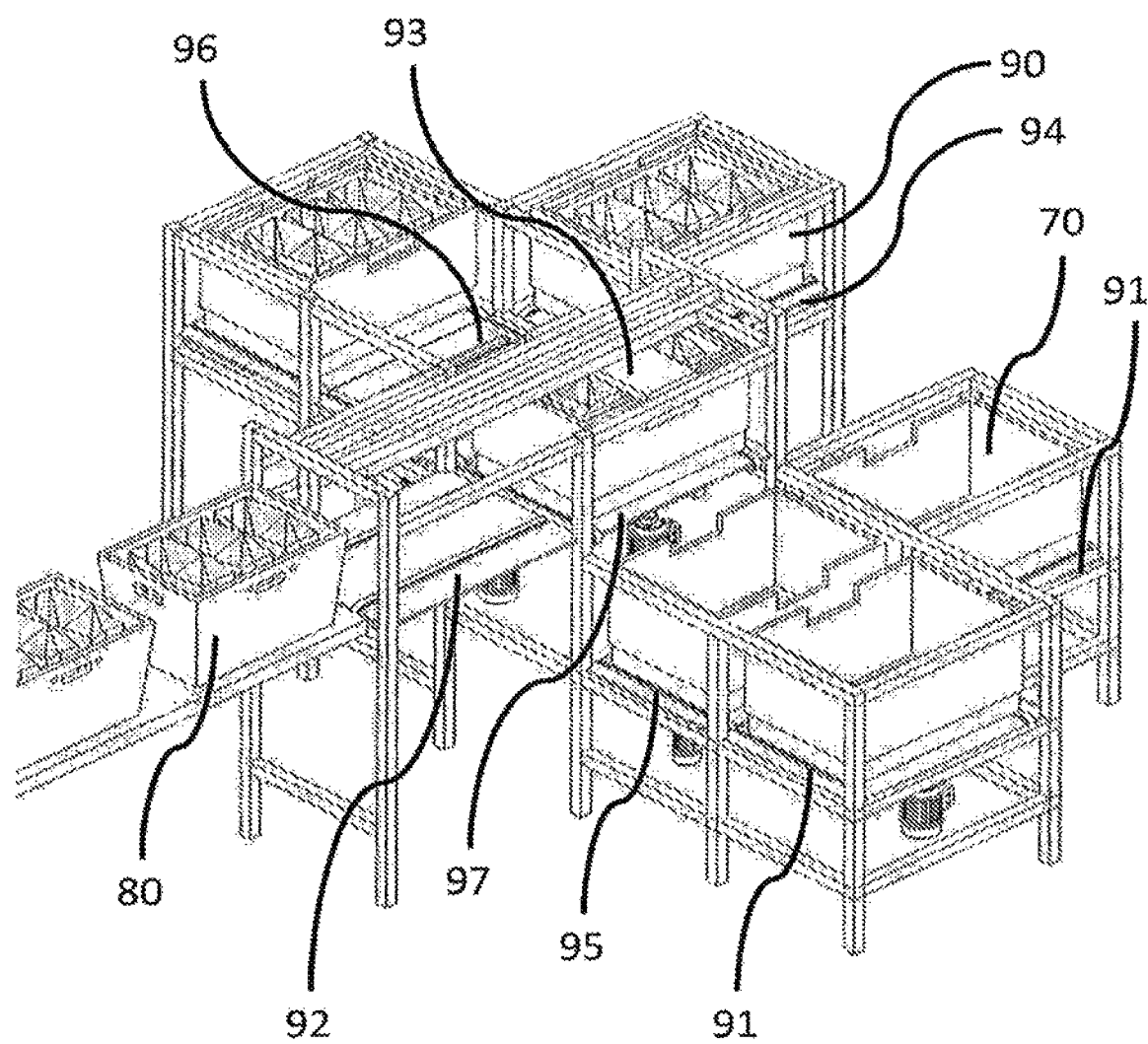
Figure 14:
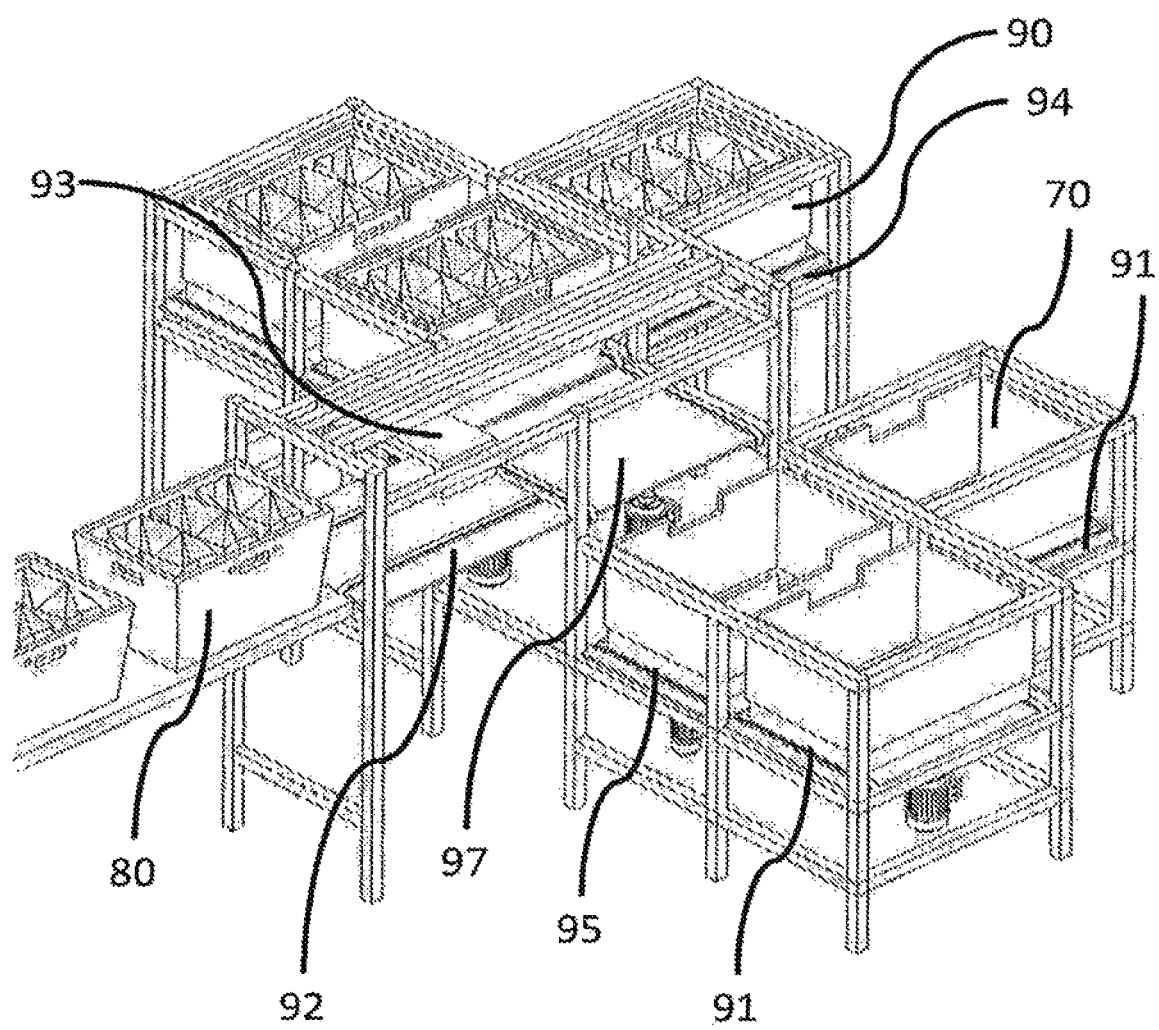
Figure 15:
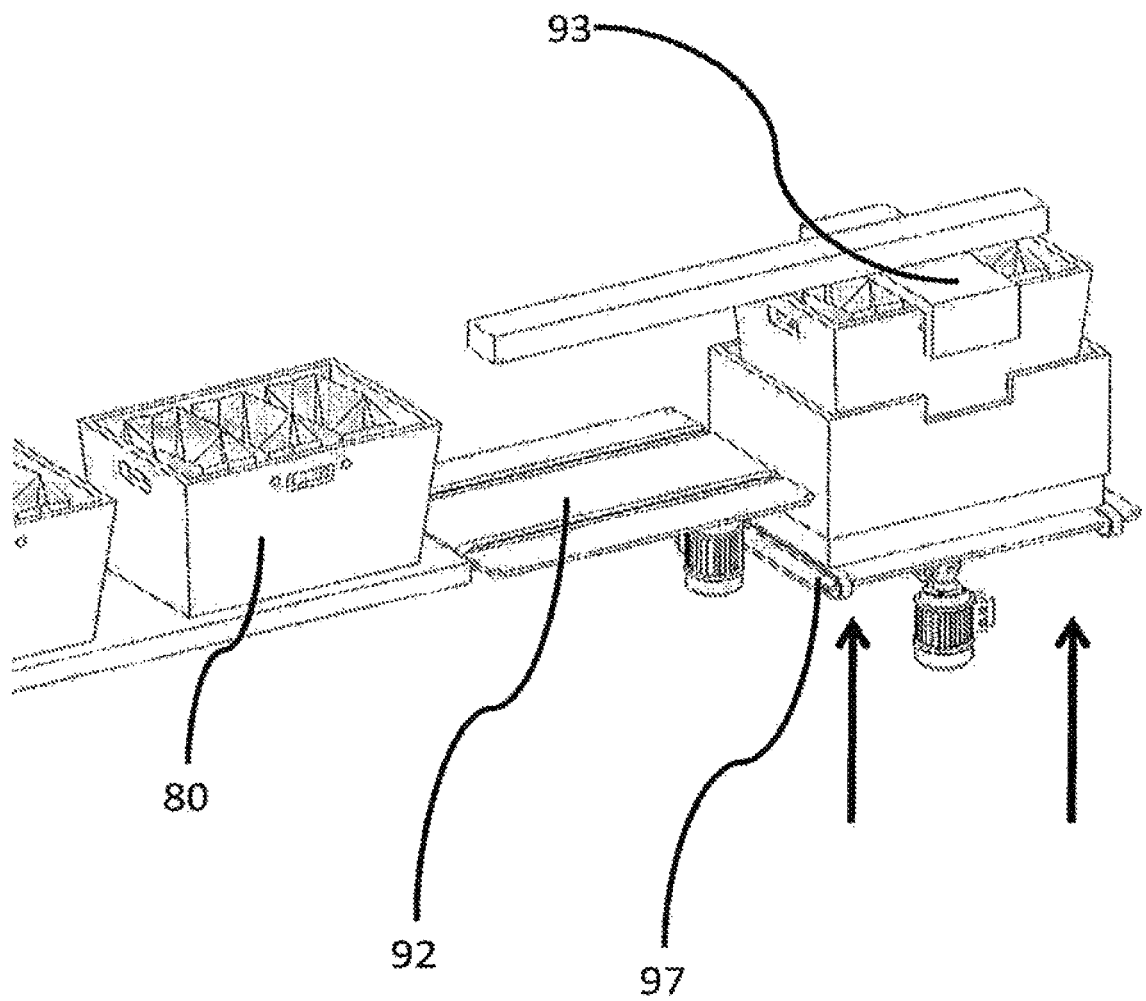

FIG. 9 shows a possible implementation of a machine to place delivery containers 80 into storage containers 70 with the help of moveable load handlers 40. FIGS. 10 to 16 show the same arrangement, with some elements removed for clarity. In this example, empty, but bagged, delivery containers 80 can arrive by conveyor to a transfer station 92. Storage containers 70 can be deposited by moveable load handlers 40 onto transfer stations 91 and then moved by conveyor 95 to a merge station conveyor 97. A transfer mechanism 93 lifts the delivery container 80 and moves it over the merge station conveyor 97. The merge station conveyor 97 with the empty storage container 70 can then be elevated by a lifting mechanism and the delivery container 80 released from the transfer mechanism 93. The combined delivery and storage containers 90 can now be transferred from the merge station conveyor 97 onto a conveyor 96 and on to a pick-up station 94. From the pick-up stations 94 the combined delivery and storage containers 90 can be retrieved by moveable load handlers 40 and taken to an order picking station 4. FIG. 11 shows an example view before the empty storage container 70 has been elevated on the merge station conveyor. FIGS. 12 and 13 show the progression of the example merge process as the empty storage container is lifted and encircles the delivery container. FIG. 14 shows an example view after the storage container 70 has been elevated and the delivery container 80 has been released to form a combined delivery and storage container unit. FIG. 15 gives a detailed view of the example merge station 97 and transfer mechanism 93.

While the example merge process above describes how an empty storage container is lifted to receive the delivery container, in another embodiment, the delivery container can be positioned over and lowered into the storage container with the transfer mechanism 93 or any other mechanism.

In other embodiments, any other additional or alternative mechanism(s) may be used to place delivery containers into storage containers.

In some examples, the sequence of operations for the merge process can be performed in the reverse order to remove a delivery container from a storage container.

In some embodiments, one or more processor(s), controller(s), and/or other control system devices (which may be collectively referred to generically as processor(s) throughout this disclosure) can be configured to coordinate or otherwise control the timing of the operations of the conveyor(s), clamp(s), lifting mechanisms, load handler(s). This coordination can, in some examples, include ensuring that the timing of clamp(s), lifter(s) and/or conveyor(s) operations are coordinated such that delivery containers can be quickly and efficiently placed into or removed from storage containers.

Figure 16:
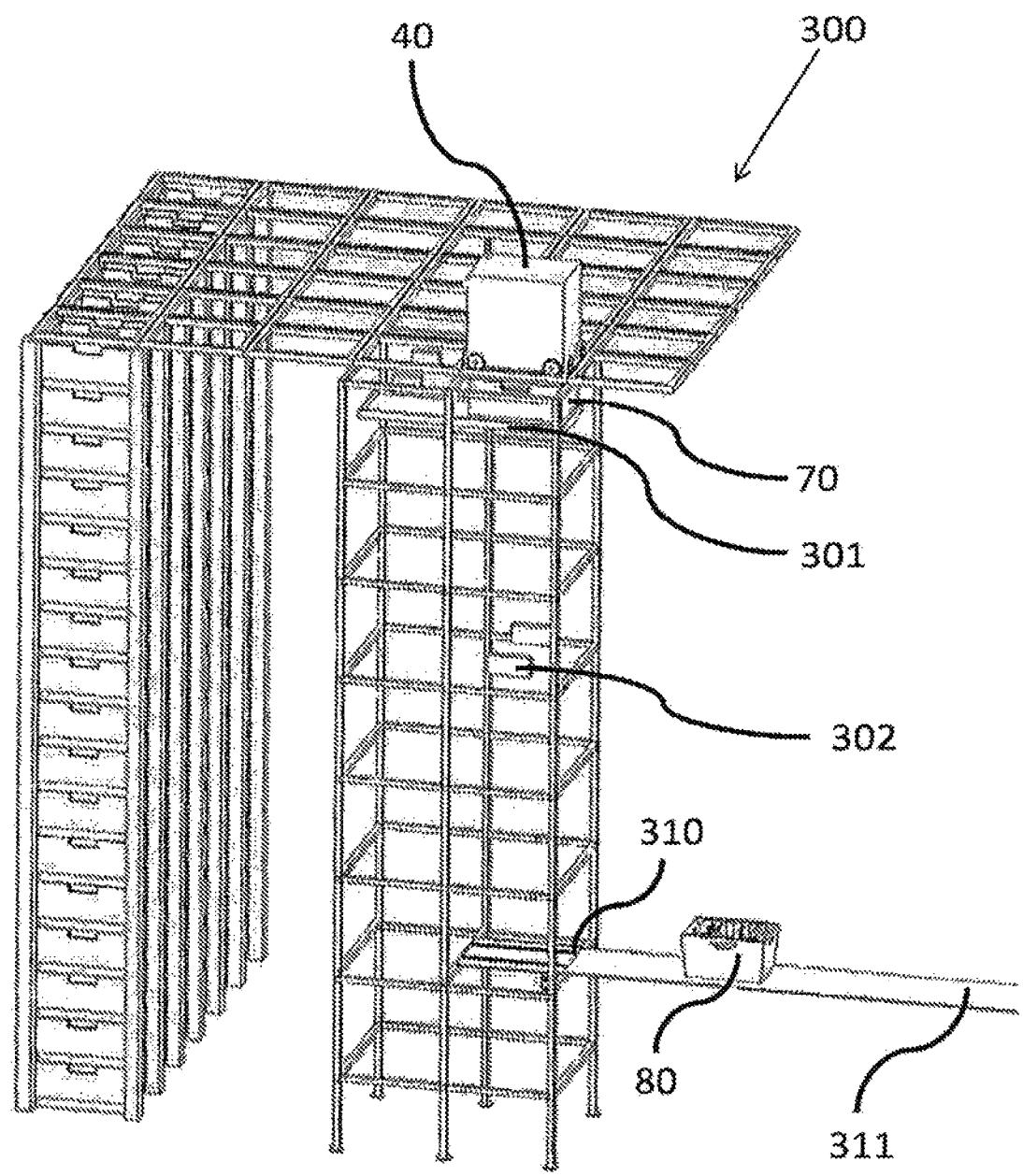
Figure 17:
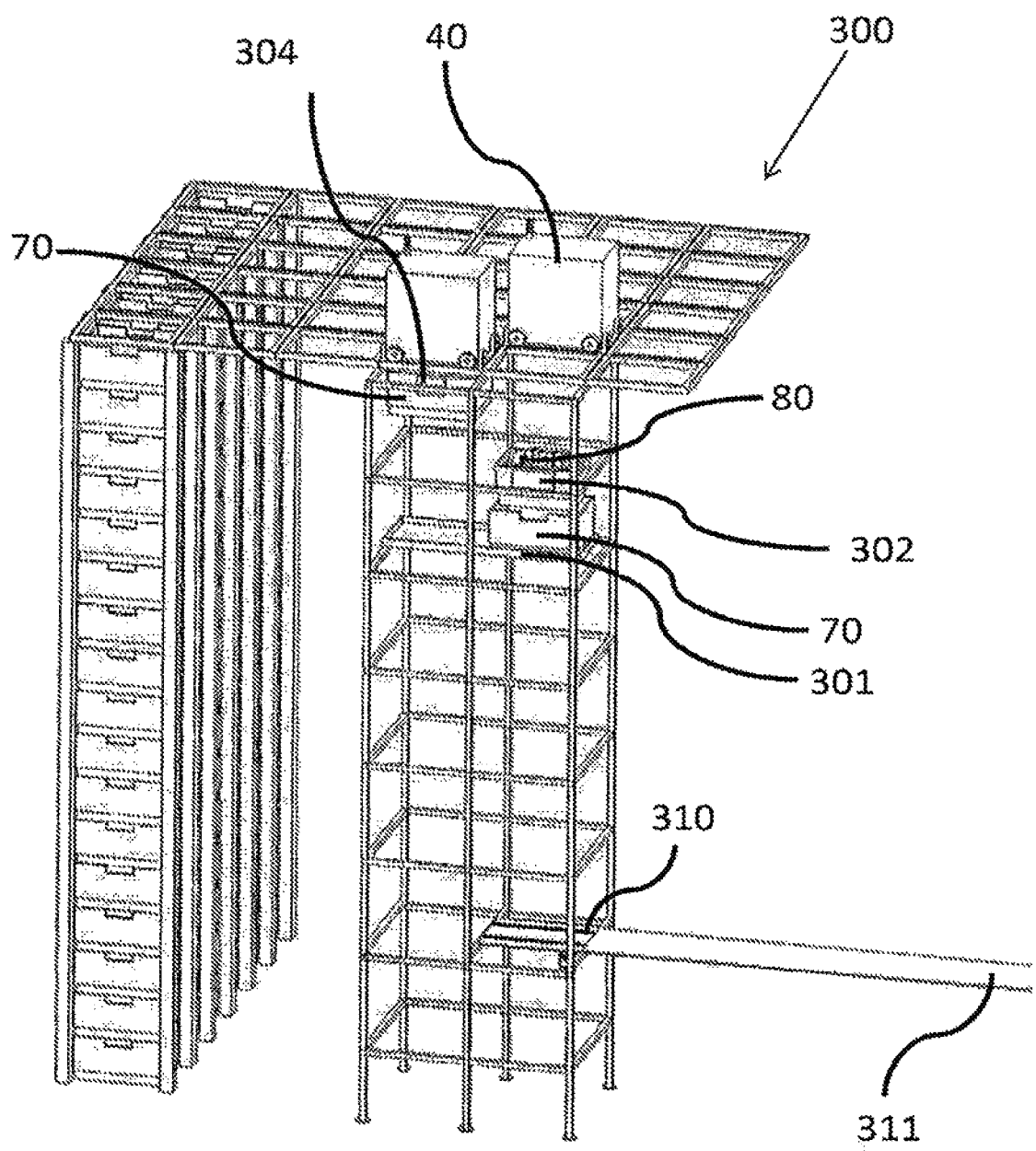
Figure 18:
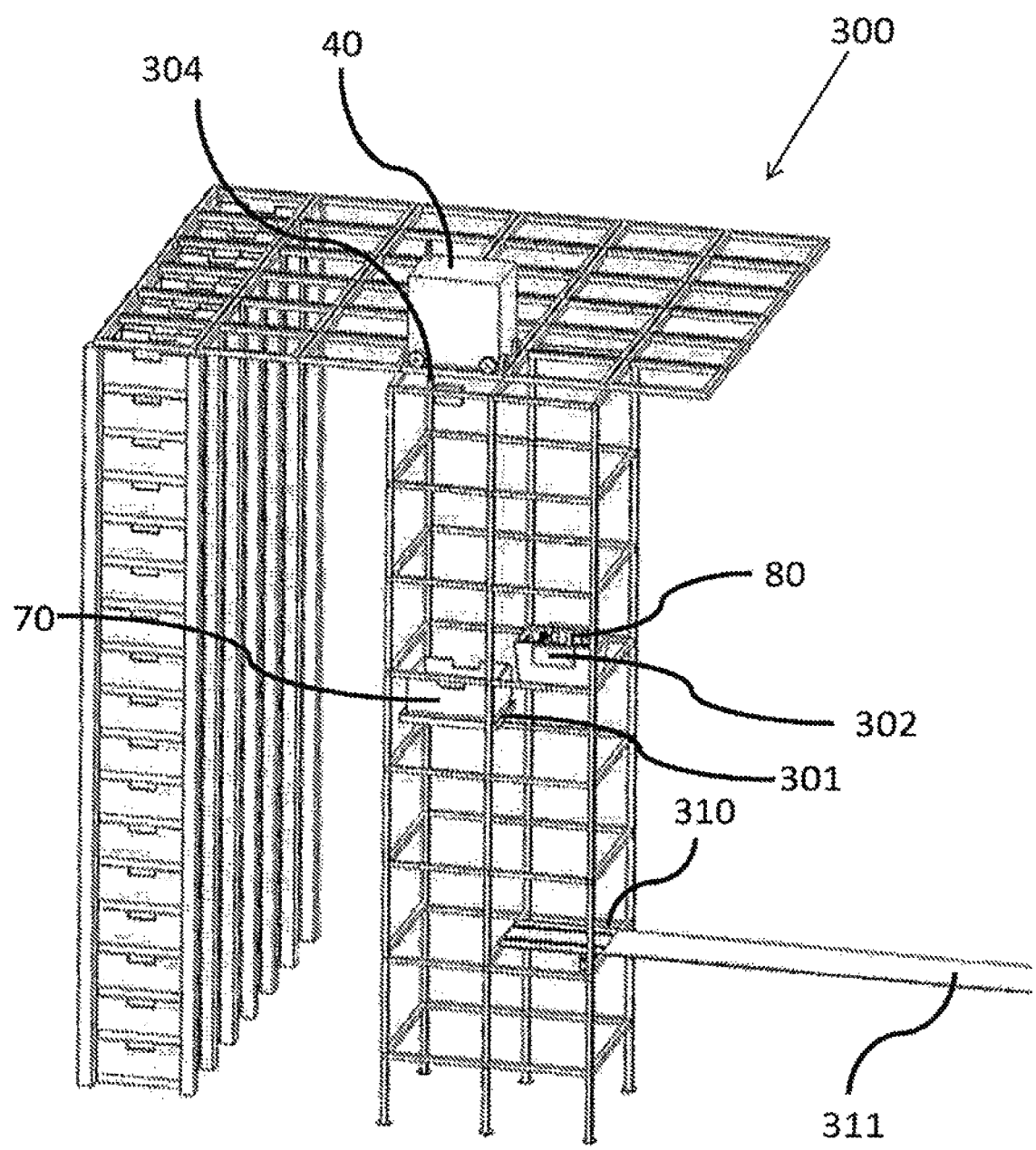
Figure 19:
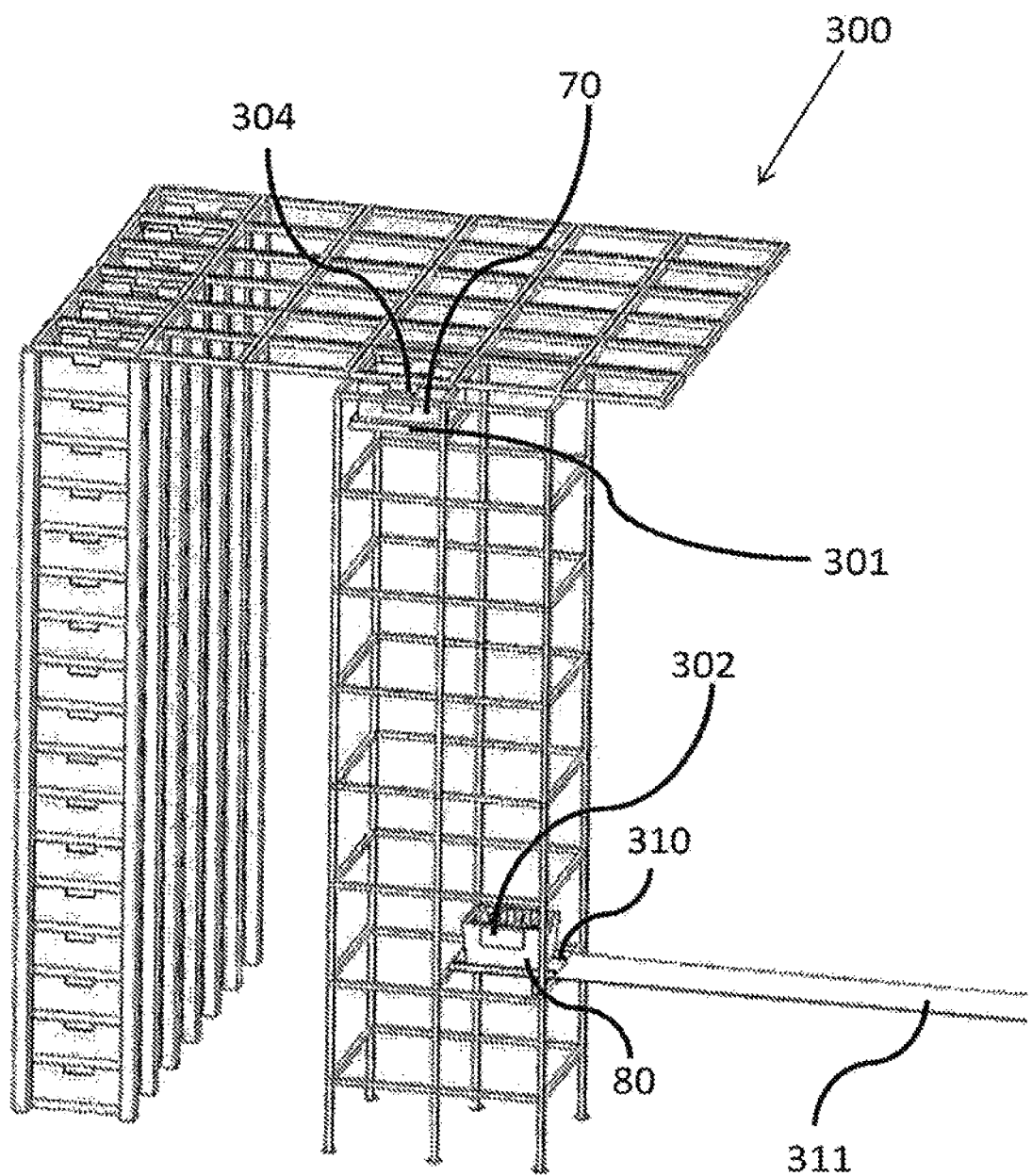
Figure 20:
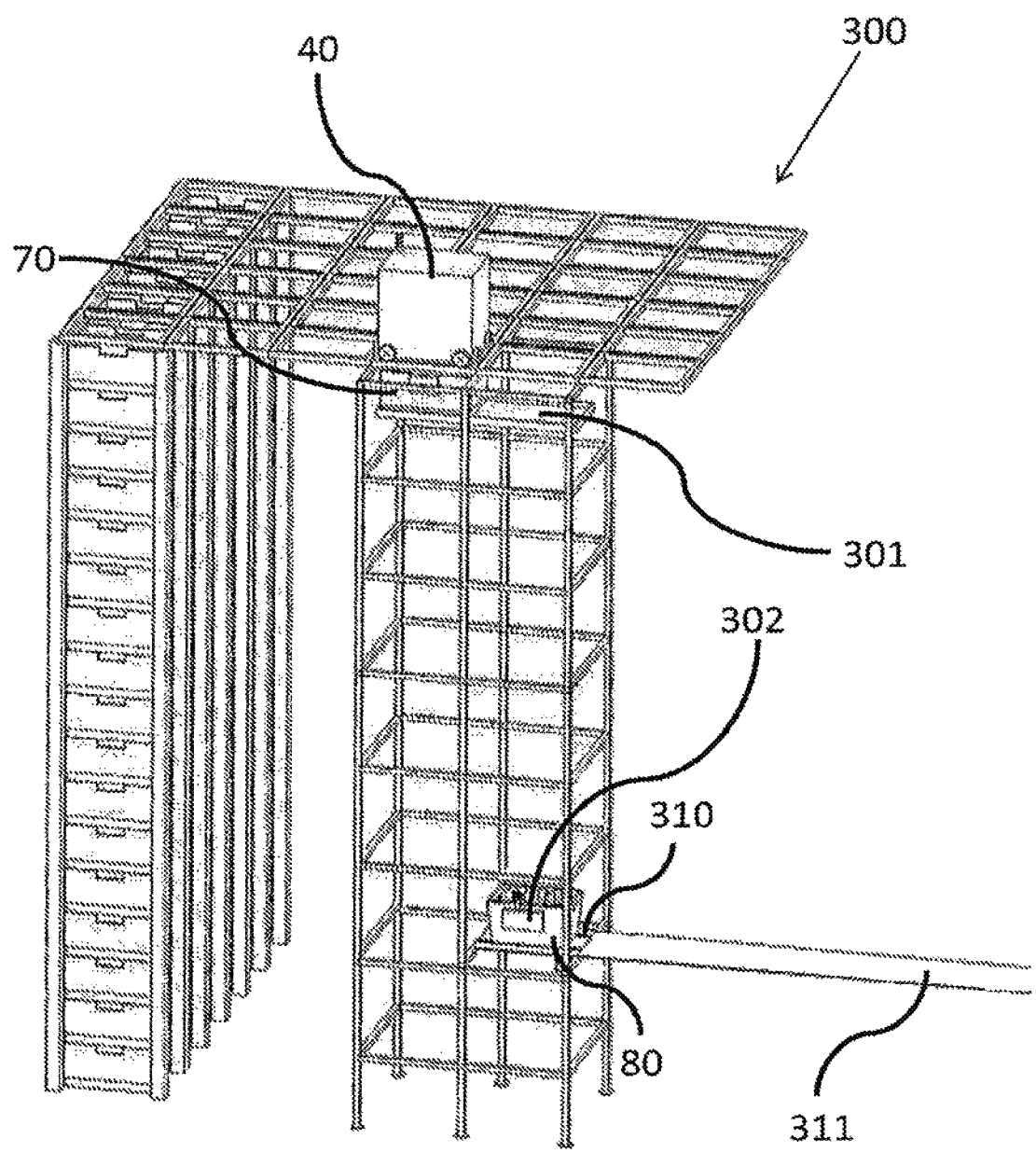

FIGS. 16 to 20 show an example arrangement 300 to extract completed delivery containers 80 from combined delivery and storage containers 90. In FIG. 16, the process starts with a moveable load handler 40 depositing a combined delivery and storage container 90 onto a transfer platform 301. The delivery container 80 is then secured by clamps 302, which can travel vertically on a lift mechanism (not shown). In FIG. 17, while the delivery container 80 is secured by the clamps 302, the transfer platform 301 drops down and moves sideways in FIG. 18, carrying the storage container 70 away from the delivery container. In FIG. 19, the clamps 302 can now move down using a lift mechanism (not shown) and deposit the delivery container 80 to a transfer location 310 where a conveyor or other mechanisms can transfer the delivery container 80 to another location. Concurrently, the transfer platform 301 can move up towards a transfer location with clamps 304. In FIG. 20, a conveyor 311 or other mechanisms can carry the delivery container 80 away, for instance to get loaded onto a vehicle. Meanwhile, the storage container 70 can be secured by clamps 304, allowing the transfer platform 301 to return to the start position to receive another combined delivery and storage container 90. A moveable load handler 40 can now retrieve the empty storage container 40 and take it, for instance to a machine as described in FIGS. 9-15, or to some other place.

In some examples, the sequence of operations for the extraction process can be performed in the reverse order to place a delivery container into a storage container.

The above examples can be used additionally or alternatively to the mechanisms described and illustrated with respect to FIG. 8. In one embodiment, one or more suction device(s) can be used to retain the delivery and/or the storage container to enable removal of the delivery container from the storage container.

Such automation may be implemented by, for example, providing automated controllers for the various systems and components described, including any or all of systems 1000, 400, 4, 3, 5, 6, 40, etc. Such automation may be provided in any suitable manner, including for example the use of automatic data processors executing suitably-configured, coded, machine-readable instructions using a wide variety of devices, some of which are known and others of which will doubtless be developed hereafter. Processor(s) suitable for use in such implementations can comprise any one or more data processor(s), controller(s), computer(s), and/or other system(s) or device(s), and necessary or desirable input/output, communications, control, operating system, and other devices or components, including software, that are suitable for accomplishing the purposes described herein. For example, a suitably-programmed general-purpose data processor provided on one or more circuit boards will suffice.

Figure 21:
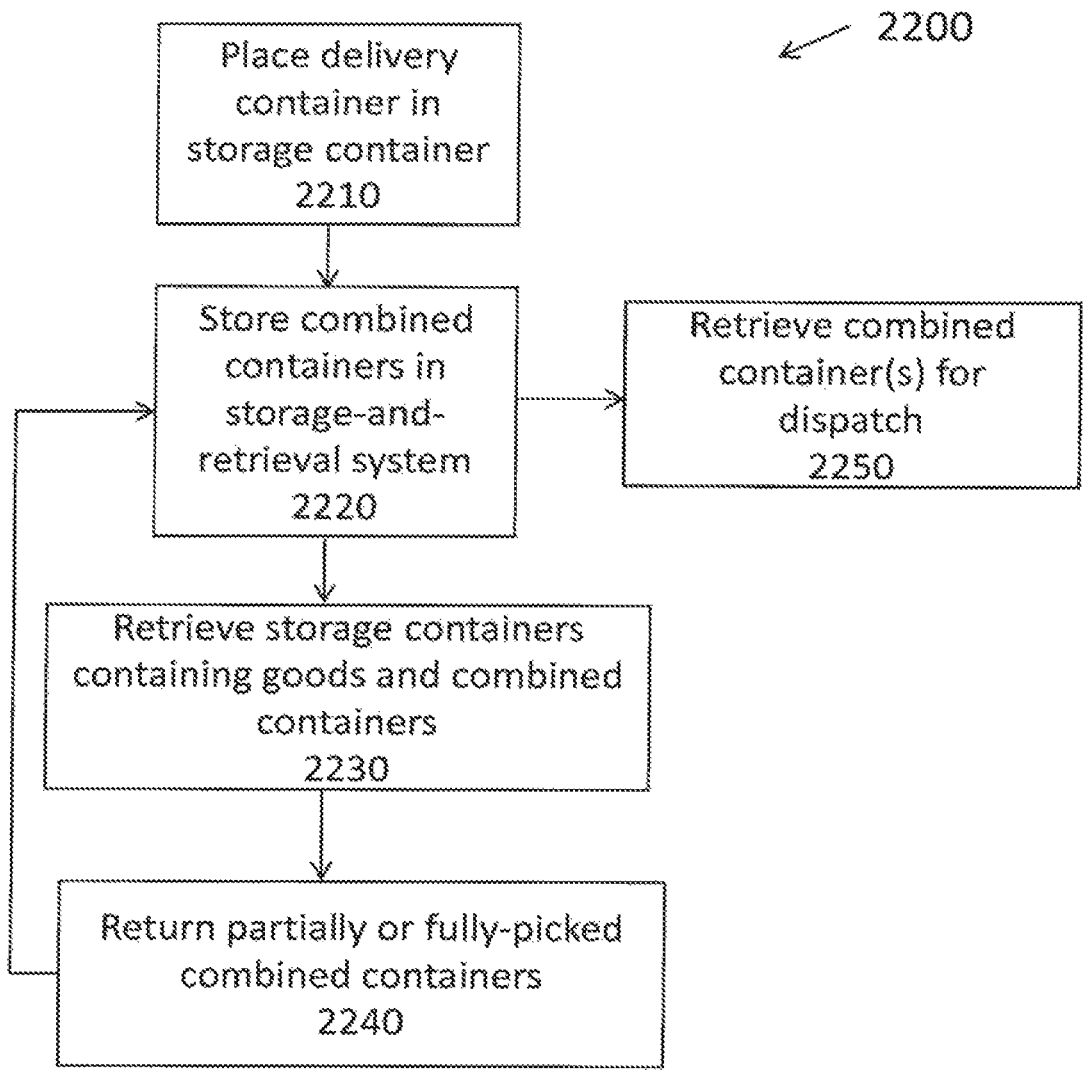
FIG. 21 is a flow diagram illustrating aspects of an example method.

FIG. 21 shows an example method 2200 for handling storage containers. At 2210, one or more processor(s) can be configured to generate signals to place a delivery container into a storage container. In some examples, this can include generating signals for controlling or instructing at least one mechanism for raising a storage container to encircle a delivery container, or for lowering a delivery container into a storage container.

At 2220, the processor(s) can be configured to generate signals to store the combined delivery and storage container unit in the storage-and-retrieval system 400. In some examples, this can include generating signals for controlling or instructing at least one mechanism (such as conveyor(s) and/or load handler(s)) for transporting and/or storing the combined container unit in a storage location within the storage-and-retrieval grid or other structure.

In some embodiments, this same storage-and-retrieval grid or other structure can stores storage containers containing inventory. For example, multiple fungible items can be stored within a single storage container within the storage-and-retrieval system.

Upon receipt of a request to fulfill an order or upon any other trigger, at 2230, the processor(s) can be configured to generate signals to retrieve storage container(s) containing item(s) to be picked, as well as delivery and storage container units. In some examples, this can include generating signals for controlling or instructing at least one mechanism such as one or more load handlers to retrieve the required containers (containing items or delivering containers) for transport to a picking or work station 4. In some examples, the processor(s) can generate signals for controlling or instructing at least one mechanism (such as conveyor(s) and/or shuttle(s)) to transport the container(s) to the picking or work station 4.

The processor(s) can be configured to coordinate the retrieval of the container(s) based on any number of factors including but not limited to load handler or other mechanism loads, transport congestion, order priorities, picking station priorities, and the like. In some examples, the retrieval of container(s) containing item(s) and container(s) containing delivery container(s) can be performed simultaneously or concurrently by a plurality of load handlers or other mechanisms.

In some examples, the retrieval of container(s) can be performed sequentially or atemporally with one another. For example, a container containing items to be picked may already be at a picking station for a previous order, and a container containing a delivery container can be subsequently retrieved and transported to the picking station to receive an item from the container used for the previous order. This or any other order or sequence of retrieving container(s) can be controlled by the processor(s) with an aim to achieve high throughput, utilization and/or efficiency.

In some embodiments, upon being combined/nested, instead of being stored into the storage-and-retrieval system (for example at 2220), some or all empty delivery and storage container units can be transferred directly to a picking or workstation. This can be optionally performed based on demand or based on system configurations or settings.

At 2240, the processor(s) can be configured to return partially or fully-picked delivery container(s) stored within storage container(s) to the storage-and-retrieval system. This can be performed similarly to 2220 or otherwise.

In some examples, partially picked delivery containers (i.e. containers into which additional items are to be picked) stored in the storage-and-delivery system can be subsequently retrieved again and transported to a picking station or work station for additional picking. In this manner, orders can be picked in one or more stages. In some examples, multi-stage picking may be utilized to partially fill low priority or prospective orders. In some examples, multi-stage picking may occur when inventories are low or when leaving a container at the picking station may cause a backlog of resources.

At 2250, the processor(s) can be configured to retrieve delivery container(s) stored within storage container(s) for dispatch. In some examples, this can include generating signals for controlling or instructing at least one mechanism (such as conveyor(s) and/or load handler(s)) for retrieving combined container unit(s) from the storage-and-retrieval grid and/or transporting it to a location for dispatch. In some examples, this can also include generating signals for controlling or instructing at least one mechanism (see for example FIGS. 8-20) for removing the delivery container(s) from the storage container(s) as described herein or otherwise.

In some examples, by storing delivery containers in the storage-and-retrieval system, the processor(s) can be configured to retrieve the delivery containers in a particular sequence or grouping in preparation for dispatch. In some embodiments, the sequence or grouping can be determined/defined to simplify dispatch activities such as container sorting, vehicle loading, prioritizing orders, etc. For example, the processor(s) can be configured to generate signals for retrieving all delivery containers for dispatch in a particular vehicle, for a particular route, for a particular shipment window, for a particular destination, etc. The processor(s) can be configured to retrieve delivery containers in a specific order for loading a vehicle and/or in a sequence associated with a sequence in which the containers may be delivered.

While the disclosure has been provided and illustrated in connection with specific, presently-preferred embodiments, many variations and modifications may be made without departing from the spirit and scope of the invention(s) disclosed herein. The disclosure and invention(s) are therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the invention is to be defined solely by the appended claims, giving due consideration to the doctrine of equivalents and related doctrines.

The invention claimed is:

1. A system for storing and retrieving goods, the system comprising:
   a plurality of delivery containers each configured to carry one or more of a plurality of picked items to a delivery destination;
   a plurality of storage containers each configured to store one or more of a plurality of inventory items, the plurality of storage containers each being configured to contain one or more of the plurality of delivery containers to form a combined container, the plurality of storage containers comprising a first storage container that contains at least one of the plurality of inventory items and a second storage container that contains at least one of the plurality of delivery containers to form one combined container;
   a structural framework defining a grid of storage locations, the grid being configured to store the plurality of storage containers in stacks arranged in rows and columns; and
   a plurality of robotic load handlers configured to:
     move along a top of the grid;
     transport the first storage container and the second storage container to and from different storage locations within the grid; and
     transport the first storage container and the second storage container to an order picking station.

2. The system of claim 1, wherein the grid comprises two sets of rails configured to facilitate access to the storage locations by the plurality of robotic load handlers, and the plurality of robotic load handlers each comprises two sets of wheels configured to engage with the two sets of rails, the two sets of wheels comprising a first set of wheels configured to engage with a first set of rails and a second set of wheels configured to engage with a second set of rails.

3. The system of claim 1, wherein at least a part of each of the plurality of storage containers is of a heavier gauge than each of the plurality of delivery containers.

4. The system of claim 1, wherein the at least one of the plurality of delivery containers contained in the second storage container stores a shopping bag configured to store at least one of the plurality of picked items.

5. The system of claim 1, wherein the at least one of the plurality of delivery containers contained in the second storage container comprises a shopping bag configured to store at least one of the plurality of picked items.

6. The system of claim 1, wherein the second storage container contains two or more of the plurality of delivery containers.

7. The system of claim 1, wherein the plurality of robotic load handlers are configured to, subsequent to the at least one of the plurality of inventory items being transferred from the first storage container to the second storage container at the order picking station, transport the second storage container that now contains the at least one of the plurality of inventory items from the order picking station to one of the storage locations within the grid.

8. The system of claim 1, wherein the plurality of delivery containers are different from the plurality of storage containers.

9. The system of claim 1, wherein at a first time:
   the first storage container does not contain a delivery container,
   a first combined container stored within the grid contains one or more of the plurality of picked items to facilitate fulfilling a first customer order,
   a second combined container stored within the grid contains one or more of the plurality of picked items to facilitate fulfilling a second customer order, and a third combined container stored within the grid is empty of any of the plurality of picked items.

10. The system of claim 1, wherein the plurality of robotic load handlers are configured to transport the second storage container to a conveyer which is configured to provide the second storage container to the order picking station, the top of the grid comprising two sets of rails configured to facilitate access to the storage locations by one or more of the plurality of robotic load handlers.

11. The system of claim 1, wherein two or more of the plurality of storage containers are stacked to form a first stack within the grid, and one storage container of the first stack positioned at a bottom of the first stack is configured to support a weight of the other storage containers in the first stack.

12. The system of claim 11, wherein at least a part of each of the storage containers that form the first stack have a thickness and a stiffness suitable to support the weight of the other storage containers in the first stack.

13. The system of claim 11, wherein at least a part of each of the storage containers that form the first stack are of a gauge sufficient to support the weight of the other storage containers in the first stack.

14. The system of claim 1, wherein the first storage container contains:
at a first time, the at least one of the plurality of inventory items, the first storage container not containing a delivery container at the first time, and
at a second time, one or more of the plurality of delivery containers which hold at least one of the plurality of picked items, the second time being different from the first time,
wherein the plurality of robotic load handlers are configured to transport the first storage container at the second time to the order picking station.

15. The system of claim 14, wherein the plurality of robotic load handlers are configured to, subsequent to the first storage container being transported at the second time to the order picking station, transport the first storage container from the order picking station to one of the storage locations within the grid.

16. The system of claim 15, wherein the plurality of robotic load handlers are configured to transport the first storage container from the one of the storage locations within the grid for conveyance of the one or more of the plurality of delivery containers from the first storage container to the delivery destination.

17. The system of claim 1, wherein each of the plurality of delivery containers comprises a bottom wall and four side walls extending from the bottom wall that together define an opening, and each of the plurality of storage containers comprises a bottom wall and four side walls extending from the bottom wall that together define an opening.

18. The system of claim 17, wherein an upper edge of each of the side walls of the at least one of the plurality of delivery containers contained in the second storage container is vertically level with or below upper edges of the side walls of the second storage container.

19. The system of claim 17, wherein one of the side walls of the at least one of the plurality of delivery containers contained in the second storage container comprises a first handle that aligns with a second handle of a corresponding one of the side walls of the second storage container.

20. The system of claim 17, wherein one of the side walls of the at least one of the plurality of delivery containers contained in the second storage container is no taller than a height of a corresponding one of the side walls of the second storage container.

21. The system of claim 17, wherein a first side wall of the second storage container is configured to engage with a lifter of one of the plurality of robotic load handlers, the lifter being configured to lift the second storage container from the grid.

22. A method operable by one or more robotic load handlers to store and retrieve goods, the method comprising:
transporting, by a first robotic load handler, a first storage container of a plurality of storage containers above a structural framework that defines a grid of storage locations for storing the plurality of storage containers in stacks arranged in rows and columns, the first storage container containing at least one of a plurality of inventory items;
storing the first storage container in a first storage location within the grid;
storing a second storage container of the plurality of storage containers in a second storage location within the grid, the second storage container containing at least one of a plurality of delivery containers to form a first combined container, the plurality of delivery containers being different from the plurality of storage containers;
retrieving, by a second robotic load handler, the second storage container from the second storage location within the grid; and
transporting, by the second robotic load handler, the second storage container above the grid to an order picking station.

23. The method of claim 22, further comprising:
placing one of the plurality of delivery containers that is empty in one of the plurality of storage containers to form a second combined container; and
storing the second combined container within the grid.

24. The method of claim 22, wherein the transporting of the second storage container is performed by two sets of wheels of the second robotic load handler moving along and engaging with two sets of rails on the grid, the two sets of wheels comprising a first set of wheels configured to engage with a first set of rails and a second set of wheels configured to engage with a second set of rails.

25. The method of claim 22, further comprising stacking two or more of the plurality of storage containers to form a first stack within the grid so that one storage container of the first stack positioned at a bottom of the first stack supports a weight of the other storage containers in the first stack.

26. The method of claim 22, wherein transporting the second storage container above the grid to the order picking station comprises delivering the second storage container to a conveyor which is configured to provide the second storage container to the order picking station.

27. The method of claim 22, wherein the first storage container does not contain a delivery container when the first storage container is transported by the first robotic load handler and stored in the first storage location.

28. A system for storing and retrieving goods, the system comprising:
a plurality of delivery containers each configured to carry one or more of a plurality of picked items to a delivery destination;
a plurality of storage containers each configured to store one or more of a plurality of inventory items and each being configured to contain one or more of the plurality of delivery containers to form a combined container, the plurality of storage containers comprising a first storage container that contains at least one of the plurality of inventory items and a second storage container that contains at least one of the plurality of delivery containers to form one combined container;

a structural framework defining a grid of storage locations, the grid being configured to store the plurality of storage containers in stacks arranged in rows and columns;

a plurality of robotic load handlers configured to move above the grid and transport the plurality of storage containers to and from different storage locations within the grid; and at least one processor configured to:
- control one or more of the plurality of robotic load handlers to store the first storage container within the grid;
- control the one or more of the plurality of robotic load handlers to store the second storage container within the grid; and
- control the one or more of the plurality of robotic load handlers to retrieve the second storage container from the grid and deliver the second storage container to a conveyor which is configured to provide the second storage container to an order picking station.

29. The system of claim 28, wherein the grid comprises two sets of rails configured to facilitate access to the storage locations by the plurality of robotic load handlers, and the plurality of robotic load handlers each comprises two sets of wheels configured to engage with the two sets of rails, the two sets of wheels comprising a first set of wheels configured to engage with a first set of rails and a second set of wheels configured to engage with a second set of rails.

30. The system of claim 28, wherein at least a part of each of the plurality of storage containers is of a heavier gauge than each of the plurality of delivery containers.

* * * * *